United States Patent
Hamanaka et al.

(10) Patent No.: US 7,383,286 B2
(45) Date of Patent: Jun. 3, 2008

(54) FILE MANAGEMENT SYSTEM WITH PARENT DIRECTORY SEARCH FUNCTIONS

(75) Inventors: Seishiro Hamanaka, Kawasaki (JP); Mamoru Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 10/173,798

(22) Filed: Jun. 18, 2002

(65) Prior Publication Data

US 2003/0009484 A1    Jan. 9, 2003

(30) Foreign Application Priority Data

Jul. 6, 2001    (JP)    .............................. 2001-206613

(51) Int. Cl.
G06F 17/30    (2006.01)
(52) U.S. Cl. ........................ 707/200; 707/1; 707/102
(58) Field of Classification Search ................ 707/1–3, 707/100–102, 200–205
See application file for complete search history.

(56) References Cited

U.S. PATENT DOCUMENTS

| | | | | |
|---|---|---|---|---|
| 4,945,475 A | * | 7/1990 | Bruffey et al. ................. | 707/1 |
| 5,832,527 A | * | 11/1998 | Kawaguchi .................. | 707/205 |
| 5,960,437 A | * | 9/1999 | Krawchuk et al. .......... | 707/102 |
| 6,230,212 B1 | * | 5/2001 | Morel et al. ................. | 719/316 |
| 6,571,231 B2 | * | 5/2003 | Sedlar .......................... | 707/1 |

OTHER PUBLICATIONS

Dominic Giampaolo, "BeOS: File System—Practical File System Design with the Be File System" (First Japanese-Language Edition), Ohmsha, Ltd., pp. 37-50 (Nov. 20, 1999).

* cited by examiner

Primary Examiner—Debbie Le
(74) Attorney, Agent, or Firm—Greer, Burns & Crain, Ltd.

(57) ABSTRACT

A file management system which locates files with less processing load and provides more sophisticated file management tasks. A file manipulation command causes a file manipulation hander to execute a file system operation, which involves placement of a given file to a specified directory, thus assigning the specified directory as a parent directory of that file. The file placement operation causes a parent directory record manager to define a parent directory record of by setting thereto the file's parent directory identifier. Afterwards, when a parent directory inquiry about a specific file is issued, a parent directory inquiry handler retrieves the parent directory record of the specified file and outputs the identifier of the specified file's parent directory that is contained in the retrieved parent directory record.

12 Claims, 29 Drawing Sheets

BEFORE MOVEMENT OF DIRECTORY

AFTER MOVEMENT OF DIRECTORY

ORIGINAL SETUP

AFTER SETTING QUOTA LIMITS TO DIRECTORY

FILE MANAGEMENT SYSTEM WITH PARENT DIRECTORY SEARCH FUNCTIONS

BACKGROUND OF THE INVENTION

1. Field of the Invention

The present invention relates to a file management system and program for managing files in a computer. More particularly, the present invention relates to a file management system and program which efficiently manage the locations of files in a directory structure.

2. Description of the Related Art

Computers incorporate file systems into their core mechanisms to manage program and data files stored in a hard disk drive (HDD) and other storage devices. File system is a logical structure consisting of substantive records of files and additional information for managing their locations and usage.

Most file systems employ a hierarchical architecture to ease the management of a large number of files. In such a hierarchical file system, directories and user files are modeled as nodes and leaves of a tree. Individual files are identified by their locations in the hierarchical structure, in combination with their file names. The location of a file is obtained by tracing nodes and links of the tree structure from its root directory. The discovered route from the root directory to the file of interest is called "path name" (or simply "path"). File systems locate a particular file by using its path name and file name as key information.

Each directory accommodates files and child directories (also called "subdirectories"), and the file system has to manage such hierarchical relationships among such objects. Conventional file systems achieve this by maintaining management data of each individual directory. Every file can therefore be reached by following the directory structure from top to bottom, if its path name and file name are given.

Conventional file systems, however, do not have facilities for upward tracing of the directory tree, from a low-level file to its parent directories. For this reason, it is not easy to find the path name of a specific file when that file has been identified with some unusual method other than the normal directory search. If this is the case, the conventional file management system has to perform an exhaustive search for possible paths, starting from the root directory. Considering the probability of discovery, the search should cover, on average, one half of the file system before the requested path name is successfully found. This is unsuitable, however, for heavily-loaded large-scale file systems because they are supposed to process a lot of transactions at high speeds.

The lack of upward search facilities hampers conventional file systems from providing advanced functions. For example, think of a function that sets a certain attribute (e.g., "never update last-access date") to all files in a particular directory and its subdirectories. One possible method to implement this function is to add the attribute to each individual file and directory for later reference. When an access to a file occurs, the file system checks its corresponding attribute record to determine whether to update the last-access date of that file. The trouble occurs when a file or directory is relocated to other places. While the moved directory and its subordinate file and directories are required to inherit attributes from the destination directory, it is not practical to implement this function as a realtime task, because it would pose a large amount of processing load. Actually, conventional systems implement only a part of the above function with a limited consistency.

Consider here that a certain file has been subjected to some file manipulation. To determine what to do with that file, the file management system needs attribute information that resides somewhere up in the directory structure. If the file system was designed to be traceable from that file in the upward direction, it would be possible to find an upper-level directory whose attributes are supposed to be applied to its subordinate directories and files. In this file system configuration, there is no need to distribute attributes to all directories and files, but they can be concentrated in a certain upper directory.

As seen from the above, conventional file systems have limited themselves in a smaller range of applications, due to the lack of upward tracing capability. With conventional systems, it is difficult to apply a particular file system operation to a plurality of files and directories by setting an attribute to their common upper-level directory.

SUMMARY OF THE INVENTION

In view of the foregoing, it is an object of the present invention to provide a file management system which locate files with less processing load and thus enables more sophisticated file management tasks.

To accomplish the above object, according to the present invention, there is provided a file management program which manages computer files and directories by using their identifiers. This file management program causing a computer system to function as: a file manipulation handler which places each given file to a specified directory in response to a file manipulation command, thus assigning the specified directory as a parent directory of the given file; a parent directory record manager, responsive to the placement of the given file by the file manipulation handler, which defines a parent directory record of the given file by setting thereto the identifier of the parent directory of the given file; and a parent directory inquiry handler which retrieves the parent directory record of a specified file in response to a parent directory inquiry about it and outputs the identifier of the specified file's parent directory that is contained in the retrieved parent directory record.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
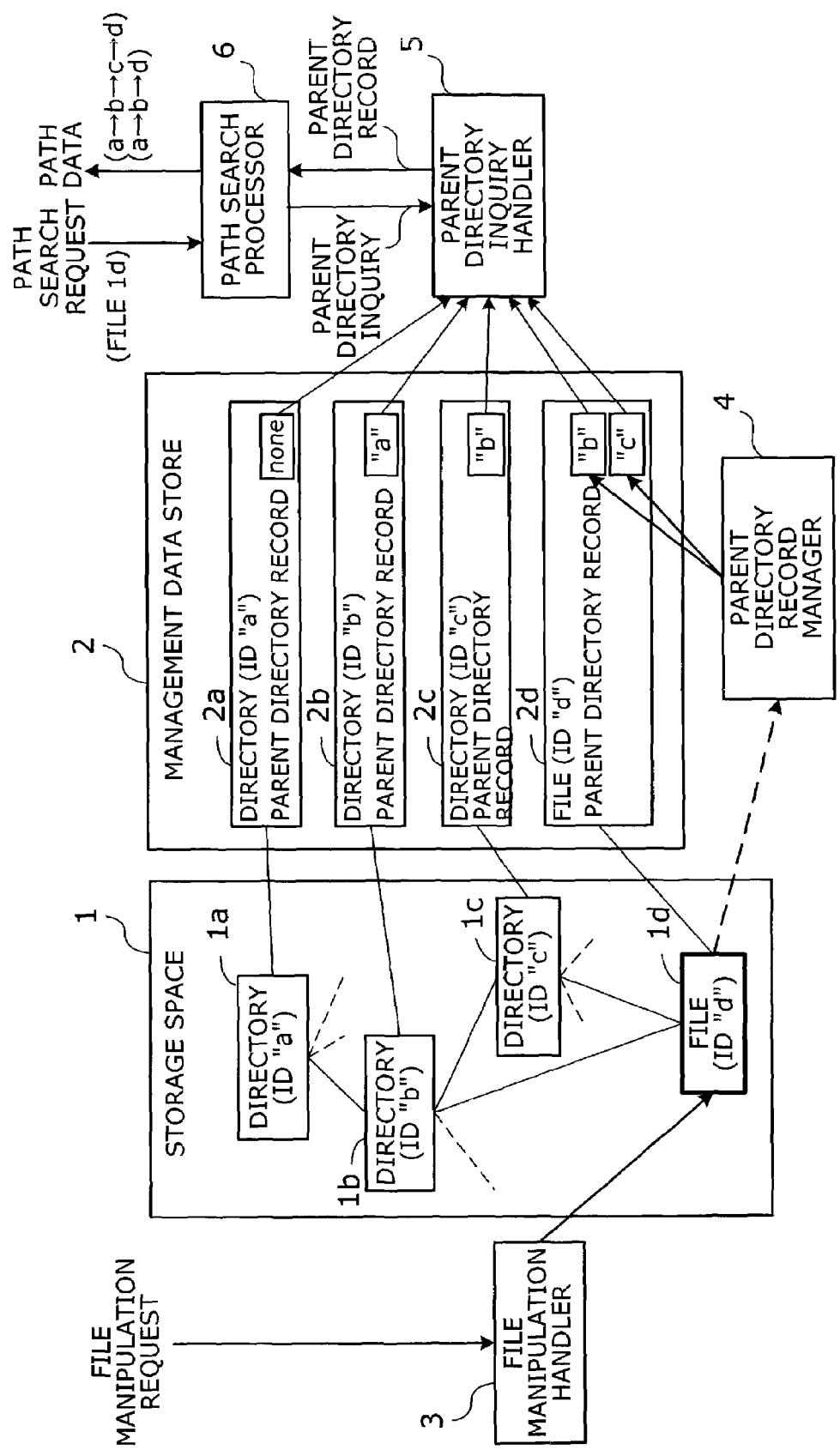
FIG. 1 is a conceptual view of the present invention.

FIG. 1 is a conceptual view of the present invention. According to the present invention, a file management program is executed on a computer system to provide the following resources and functions: a storage space 1, a management data store 2, a file manipulation handler 3, a parent directory record manager 4, a parent directory inquiry handler 5, and a path search processor 6.

The storage space 1 is physically a part of hard disk drives or other storage devices, accommodating files and directories under the control of a particular file management system. In the example of FIG. 1, the storage space 1 contains directories 1a, 1b, and 1c and a file 1d, and those data objects are organized in a tree structure with the directory 1a at the top position.

Located immediately below the topmost directory 1a is the second directory 1b, which is followed by the third directory 1c. The file 1d resides under the last two directories 1b and 1c. All directories and files are distinguished from each other by previously assigned identifiers (IDs). In FIG. 1, the identifiers "a," "b," "c," and "d," are used to refer to the directories 1a, 1b, and 1c and file id, respectively.

The management data store 2 is a collection of parent directory records each associated with a particular directory or file in the storage space 1. FIG. 1 shows four parent directory records 2a to 2d that indicate which directory is immediately above the directories 1a, 1b, and 1c and file 1d, respectively.

In response to a given file manipulation command, the file manipulation handler 3 puts a specified file in a specified directory within the storage space 1. For example, the file manipulation handler 3 places the file 1d below the second and third directories 1b and 1c when so requested, as illustrated in FIG. 1. The file manipulation handler 3 also deals with directory locations in response to similar file manipulation commands, thus manipulating the hierarchical relationships between upper and lower directories.

The parent directory record manager 4 starts its task when the file manipulation handler 3 has placed a file in the storage space 1. It defines or updates the parent directory record of that file by finding and setting the identifier of its parent directory. If a given file belongs to two or more directories, the parent directory record should include all the relevant parent directory identifiers. See the file id again. In this example, the parent directory record manager 4 sets two parent directory identifiers "b" and "c" into the parent directory record 2d, thereby indicating that the file 1d is under the second and third directories 1b and 1c.

Similarly, the parent directory record manager 4 deals with a new or existing directory when it is placed under a certain upper-level directory by the file manipulation handler 3. The parent directory record manager 4 identifies the upper-level directory and puts its identifier into the parent directory record of the lower-level directory.

The parent directory inquiry handler 5 is activated by a parent directory inquiry as to a particular file or directory. When such an inquiry is received, the parent directory inquiry handler 5 retrieves the parent directory record of the specified file or directory, and then it returns the parent directory identifier found in that record. Consider, for example, that a parent directory inquiry about the file id is issued. The parent directory inquiry handler 5 then returns two identifiers "b" and "c" since the file 1d belongs to two parent directories 1b and 1c.

The path search processor 6 handles path search requests from external applications. When such a request for a particular file is received, the path search processor 6 traces the directory structure in the upward direction, examining the directory identifier of each parent directory that is encountered. During this process, the path search processor 6 consults the parent directory inquiry handler 5 to obtain necessary parent directory records. When the root directory is reached, the path search processor 6 outputs the search result (i.e., path name), including all the directories encountered on the way to the root directory.

The above-described file management system operates as follows. For example, suppose that a file manipulation command has been issued to the system, with an intention to create a new file. The file manipulation handler 3 executes this request, creating a new file in the storage space 1. The parent directory record manager 4 then produces a corresponding parent directory record, which contains the identifier of the directory in which the new file resides.

Later, the path search processor 6 receives a path search request. The received request contains the identifier of a particular file of interest. If it is, for example, the identifier "d" of the file 1d, then the path search processor 6 issues a parent directory inquiry to the parent directory inquiry handler 5, specifying the identifier "d" of the file id in question.

In response to the inquiry, the parent directory inquiry handler 5 refers to the parent directory record 2d, which contains the information about to which directory or directories the file 1d belongs. Since the parent directory record 2d holds two parent directory identifiers "b" and "c," the parent directory inquiry handler 5 responds to the inquiry by sending "b" and "c" back to the path search processor 6.

The path search processor 6 has now learned that the file 1*d* has two parent directories, and that their identifiers are "b" and "c." It then issues another parent directory inquiry to the parent directory inquiry handler 5, requesting the information about which directory is the parent of the directory "b" (directory 1*b*). The parent directory inquiry handler 5 then returns the identifier "a," which makes the path search processor 6 send yet another inquiry as to which directory is above the directory "a" (directory 1*a*). The parent directory inquiry handler 5 returns "none" for this inquiry, indicating that the directory "a" is the root directory of the file system. The path search processor 6 has gained a series of identifiers "d→b→a."

Likewise, the path search processor 6 repeatedly sends inquiries about the other parent directory "c" (directory 1*c*) of the file 1*d*, until it reaches the root directory 1*a*. The result is another series of identifiers "d→c→b→a."

Now that it has two search results, the path search processor 6 outputs them as path data. More specifically, each series of identifiers is reversed such that the root directory will come first. In the present example, the path search processor 6 concludes its task about the file id by sending out the following two paths: "a→b→c→d" and "a→b→d."

The proposed file management system allows the user to find out the path name of a specific file in the way described above. Specifically, the proposed system enables a reverse search by tracing from a lower-level files toward the top of the directory tree until the parent directory record agrees with that of the root directory that is obtained beforehand. Moreover, the present invention permits every file to have a plurality of entries in its parent directory record. This means that the proposed system supports such a file that belongs to two or more directories, in which case a plurality of path names are produced.

The functions of the proposed file management system (FIG. 1) can be implemented as part of various computers' file system. Suitable software platforms include UNIX (a registered trademark of The Open Group), Windows (a registered trademark of Microsoft Corporation), and other operating systems. The present invention may also be implemented on a file server, in which case all client computers can enjoy the benefits of the proposed file system through the network even if they use existing technologies as their local file systems.

File Server According to the Invention

This section will describe an embodiment of the present invention, where the proposed file system is implemented as part of a file server called a "Network Attached Storage" (NAS) filer.

Figure 2:
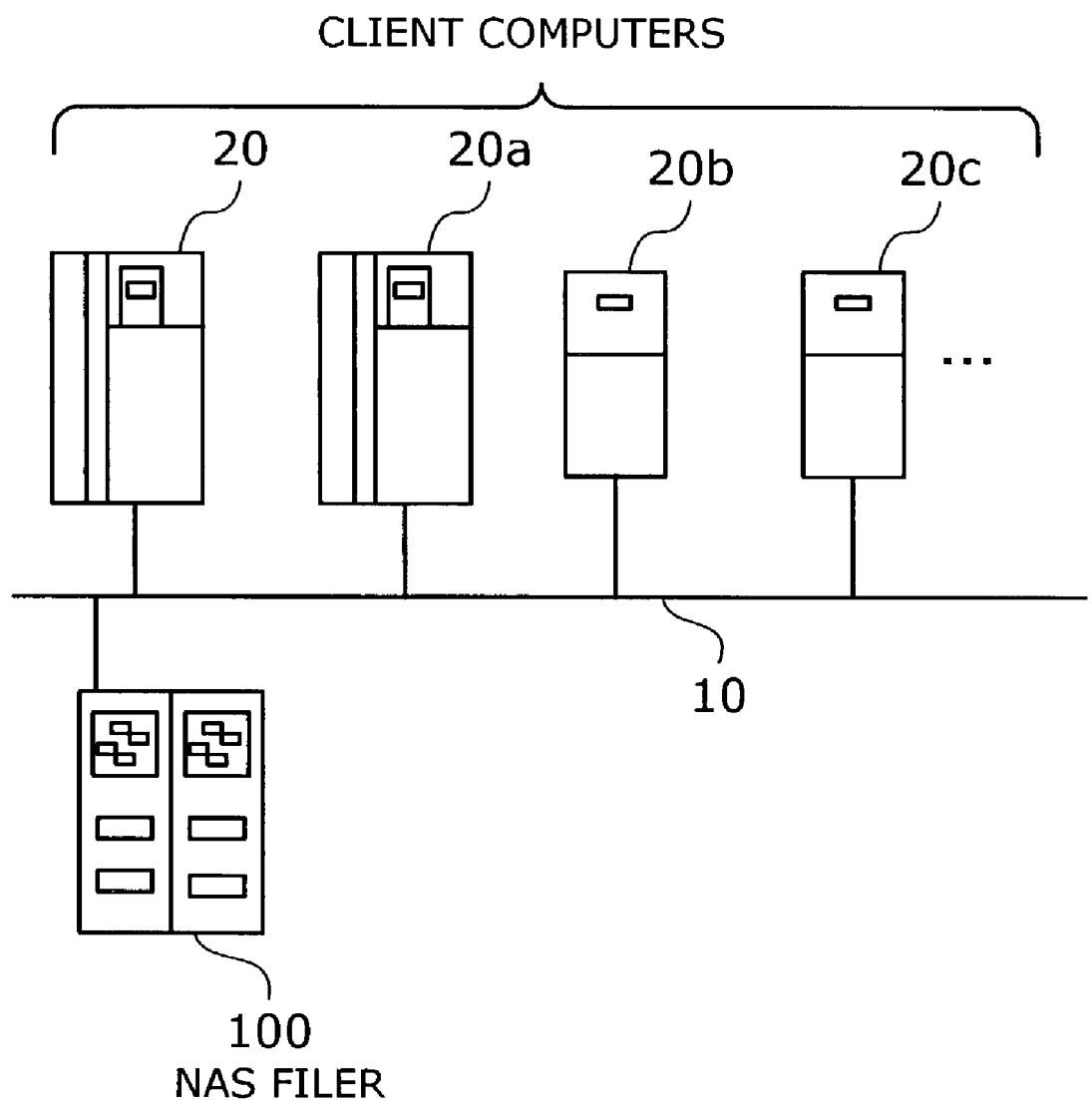
FIG. 2 shows a system according to an embodiment of the present invention.

FIG. 2 shows a system according to an embodiment of the present invention. A plurality of client computers 20, 20*a*, 20*b*, 20*c*, and so on share a single NAS filer 100 via a network 10. The network 10 is, for example, a local area network (LAN). The client computers (hereafter "clients") employ a multiuser operating system such as UNIX.

Figure 3:
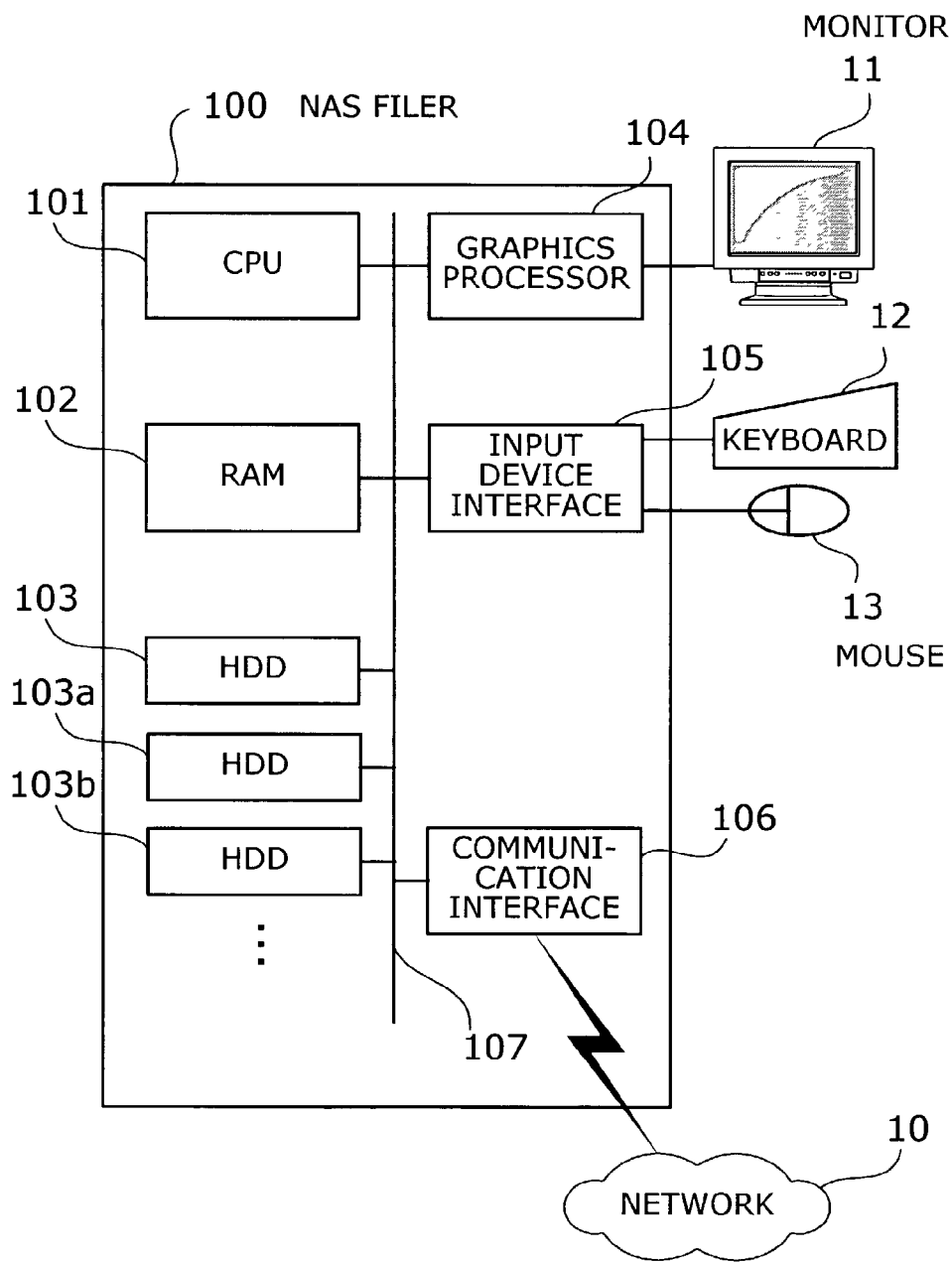
FIG. 3 shows a typical hardware configuration of an NAS filer.

FIG. 3 shows a typical hardware configuration of the NAS filer 100. The illustrated NAS filer 100 comprises the following hardware components: a central processing unit (CPU) 101, a random access memory (RAM) 102, hard disk drives (HDDs) 103, 103*a*, and 103*b*, a graphics processor 104, an input device interface 105, and a communication interface 106.

The CPU 101 controls the entire server system, interacting with other elements via a common bus 107. The RAM 102 temporarily stores at least a part of operating system (OS) programs and application programs that the CPU 101 executes, in addition to other various data objects manipulated at runtime. The HDDs 103, 103*a*, and 103*b* stores the operating system and application programs. For higher performance and reliability, those HDDs 103, 103*a*, and 103*b* are configured as a RAID (redundant array of independent disks) array.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to the network 10, allowing the CPU 101 to exchange data with other computers.

While FIG. 3 shows the NAS filer 100 alone, the clients 20, 20*a*, 20*b*, and 20*c* may be built on a similar hardware structure (although they are not necessarily required to have redundant HDDs). The functions of the client-server system (FIG. 2) are implemented on the hardware platforms described above.

Figure 4:
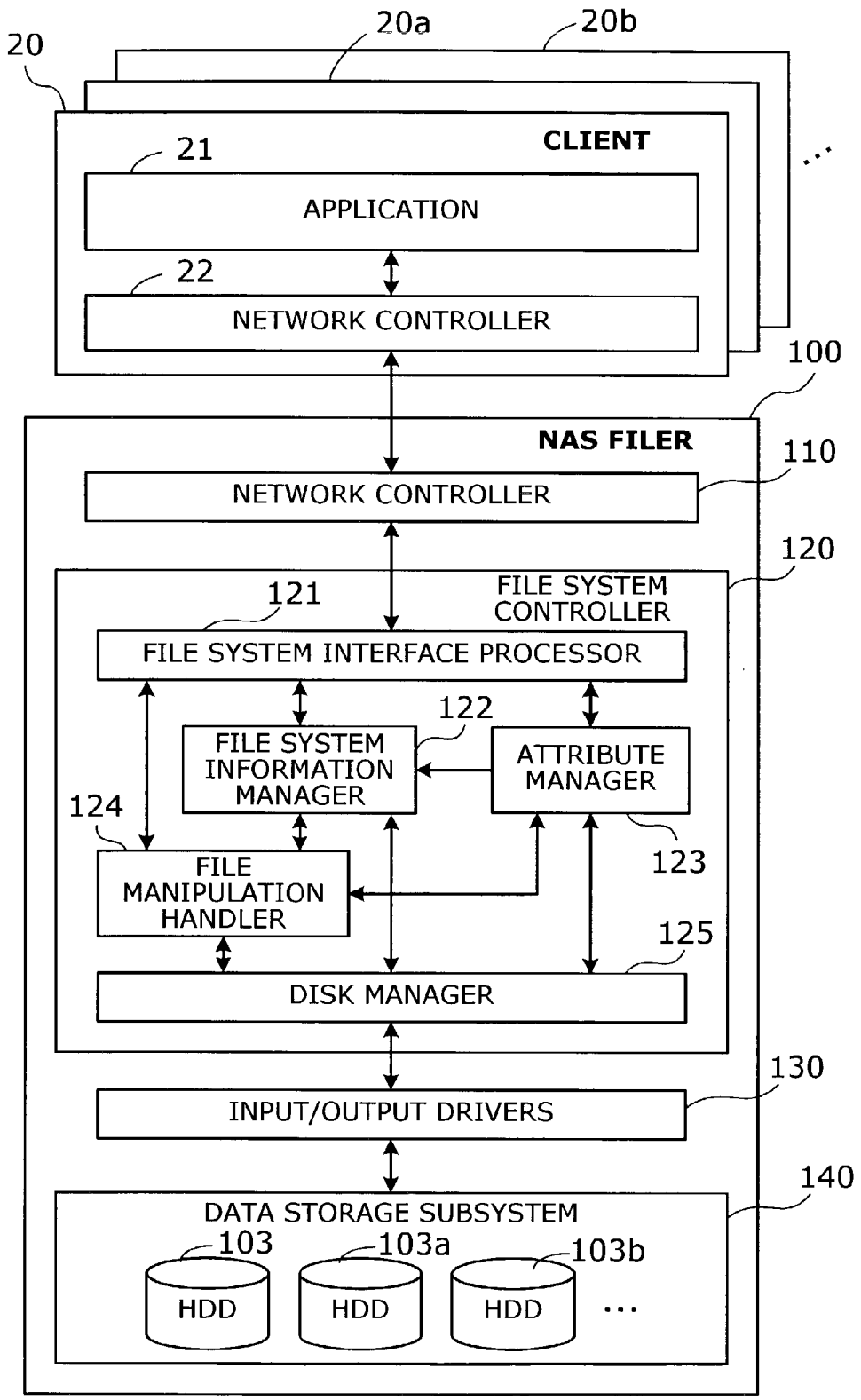
FIG. 4 is a functional block diagram which shows processing functions of the system of the present embodiment.

FIG. 4 is a functional block diagram which shows processing functions of the system of the present embodiment. The client 20 (also 20*a*, 20*b*, and so on) has an application 21 and network controller 22. The application 21 executes tasks requested by the user, which includes initiation of file manipulation commands. More specifically, it sends out commands for creating files, moving files, deleting files, and creating hard links.

The term "hard link" refers to a system-level shortcut for a substantive file. A hard link to an existing file permits the user to make access to that file by using a different file name and/or different path name, without changing its original name or path.

Ordinary file systems employs a tree structure, in which each node represents a directory containing a file or child directory, and each leaf represents a file. While some file systems do not allow it, the UNIX system-based file systems permit a plurality of directories to share a file as their direct child. Such multiple-parentage files are realized by creating hard links. The directory structure of a file system cannot be called a "pure" tree structure if it contains hard links.

The application 21 can also request the file system in the NAS filer 100 to set a specific attribute to a particular directory, and to provide the path name of a particular file.

Responsive to the application 21, the network controller 22 interacts with the NAS filer 100, using a predetermined network protocol. By doing so, the application 21 makes access to the file system that the NAS filer 100 offers.

The NAS filer 100 comprises a network controller 110, a file system controller 120, and input/output drivers 130, and a data storage subsystem 140.

The network controller 110 allows the NAS filer 100 to communicate with the clients 20, 20*a*, and 20*b* over the network 10, passing received request messages to the file system controller 120 and transmitting their corresponding response messages to the requesting clients.

The data storage subsystem 140 provides storage spaces for data files, comprising a plurality of hard disk drives (HDDs) 103 and 103*a* and 103*b*, and so on. The input/output drivers 130 controls data transfer to/from those HDDs in the data storage subsystem 140.

The file system controller 120 provides NAS services to the clients 20, 20*a*, 20*b*, and so on. To this end, it comprises the following functions: a file system interface processor 121, a file system information manager 122, an attribute manager 123, a file manipulation handler 124, and a disk manager 125.

The file system interface processor 121 receives a service request from the application 21 through the network controller 110 and interprets it into internal processing commands. Those commands are passed to the file system information manager 122, attribute manager 123, and file manipulation handler 124, as necessary for execution. When the commands are finished, the file system interface processor 121 collects the results from the file system information manager 122, attribute manager 123, and file manipulation handler 124. It assembles a response message from the collected results, and sends it back to the requesting application 21 via the network controller 110.

The file system information manager 122 manages data concerning the files and directories in the file system. More specifically, the file system information manager 122 creates and maintains parent directory records of each directory and file in the NAS system. With reference to those records, it traces a directory path from lower level to upper level.

The attribute manager 123 manages attribute information of directories and files. Attributes specify a set of rules about how the file system handles individual directories or files. For example, an attribute set to a file disables the file system to update the last access date record of that file. Another attribute limits the usage of disk blocks up to a predetermined quota limit, when it is set to a particular directory.

The file manipulation handler 124 executes various operations to a specified file in the data storage subsystem 140. They include: creating a new file, moving a file to a different directory, deleting an existing file, and creating hard links of a file.

The disk manager 125 controls data input and output operations to/from the HDDs 103, 103a, and 103b in the data storage subsystem 140, which may employ RAID mechanisms to enhance the performance and reliability.

Figure 5:
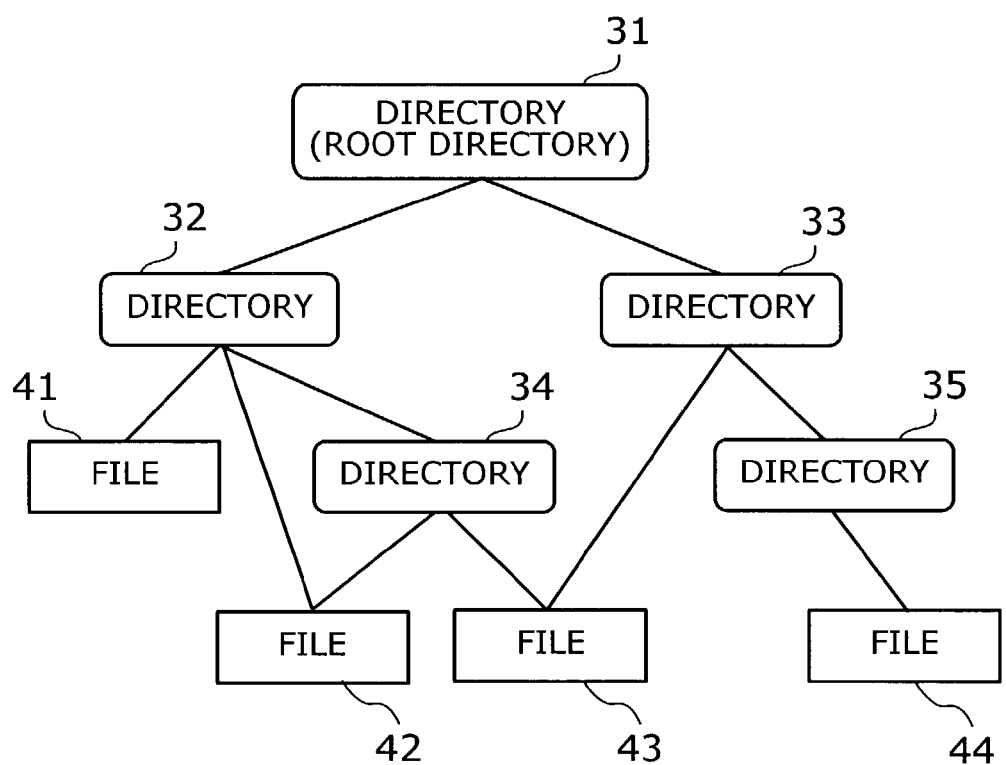
FIG. 5 shows an example of a file system structure according to the present embodiment.

Referring now to FIG. 5 and subsequent figures, the next section will go into the details of the file system provided by the above-described NAS filer system.

FIG. 5 shows an example of a file system structure according to the present embodiment. This file system contains a plurality of directories 31 to 35 and files 41 to 44. The first directory 31 is the root directory, which is located on the topmost position in the tree structure and has two immediate child directories 32 and 33. Immediately below the second directory 32 are one child directory 34 and two files 41 and 42. The third directory 33, on the other hand, has one child directory 35 and one file 43. The fourth directory 34 accommodates two files 42 and 43, and the fifth directory 35 contains one file 44.

As shown in FIG. 5, the directories 31 to 35 and files 41 to 44 are organized in a tree structure, in which the use of hard links enables the files 42 and 43 to belong to two parent directories without duplicating their substantive data content. The file 42 is a child of the second directory 32, besides being a child of the fourth directory 34. Likewise, the file 43 is a child of the third directory 33, besides being a child of the fourth directory 34.

Figure 6:
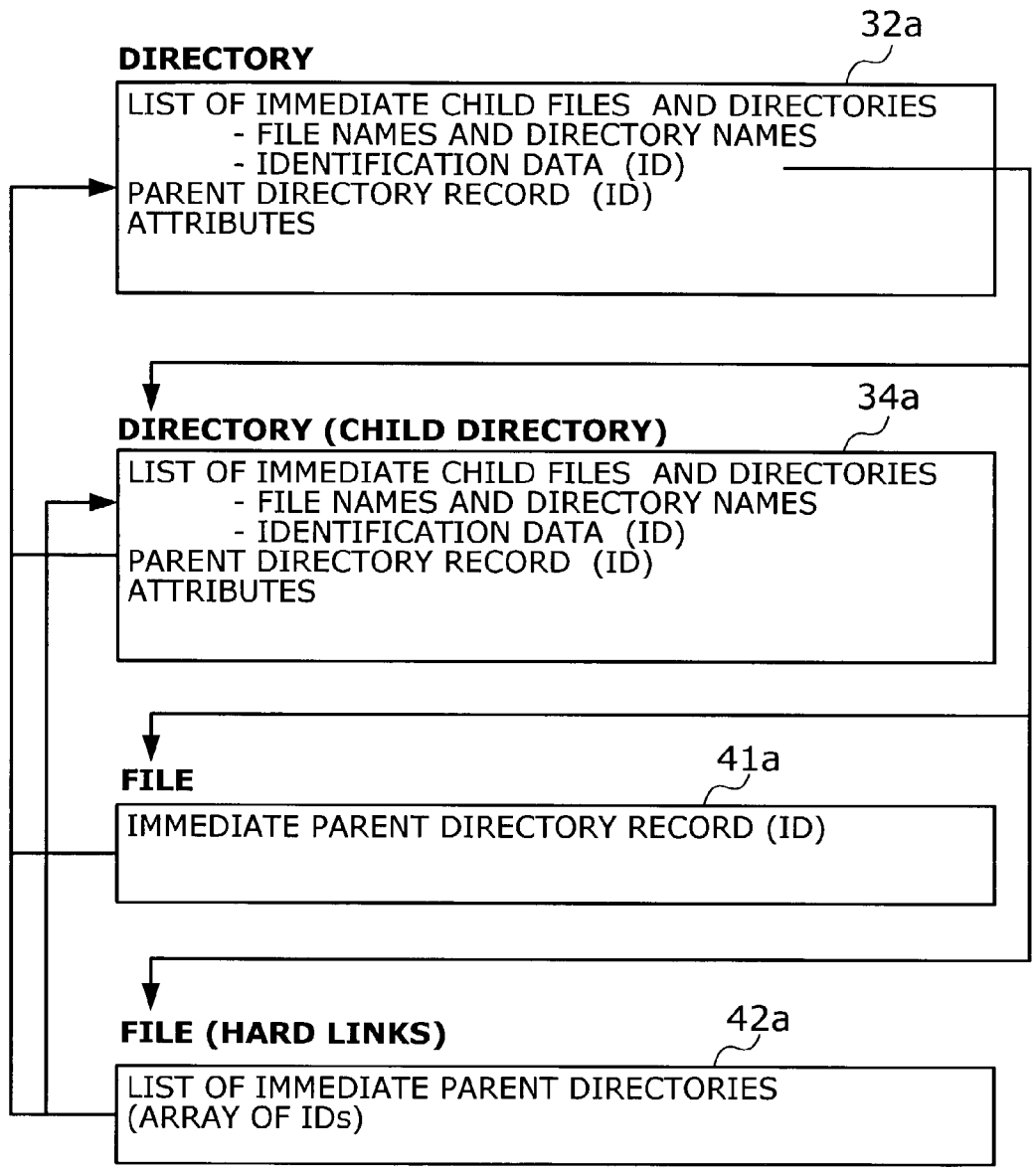
FIG. 6 shows a typical definition of file system structure.

Referring now to FIG. 6, the following part of the description will show how the management data for directories and files is defined to implement the above-described file system structure with hard links.

FIG. 6 shows a typical definition of file system structure. For simplicity, FIG. 6 represents only an excerpt from the file system of FIG. 5. More specifically, FIG. 6 shows directory management records 32a and 34a of the second and fourth directories 32 and 34, and files management records 41a and 42a of the files 41 and 42, while omitting those of the other directories and files.

The directory management records 32a and 34a contain a list of immediate child files and immediate child directories, a parent directory record, and attributes. The immediate child list includes the names of child directories and files that are located immediately below that directory, together with their identifiers. The parent directory record contains the identifier of an upper-level directory that is immediately above the present directory. The attributes specify the rules to be applied to the present directory.

The file management records 41a and 42a contain a parent directory identifier that indicates which directory is immediately above that file. Because the file 42 has two parent directories, its file management record 42a contains a list of identifiers to indicate which directories they are.

Every such management record can be referenced by using the identifier of a file or directory of interest. In the UNIX file systems, inode numbers serve as such identifiers.

As described above, each file's management record contains its parent directory identifiers. Accordingly, the file system can trace the directory tree upwards from any particular file. This feature of the invention enables the system to quickly find a path name when a file name is specified. Further, according to the present invention, each directory's management record contains attributes of that directory. The scope of these attributes can be extended to a group of child directories and files located under that directory.

The following part of the description will explain specific processing functions that the proposed file system executes.

Path Search Without Hard Link Support

Figure 7:
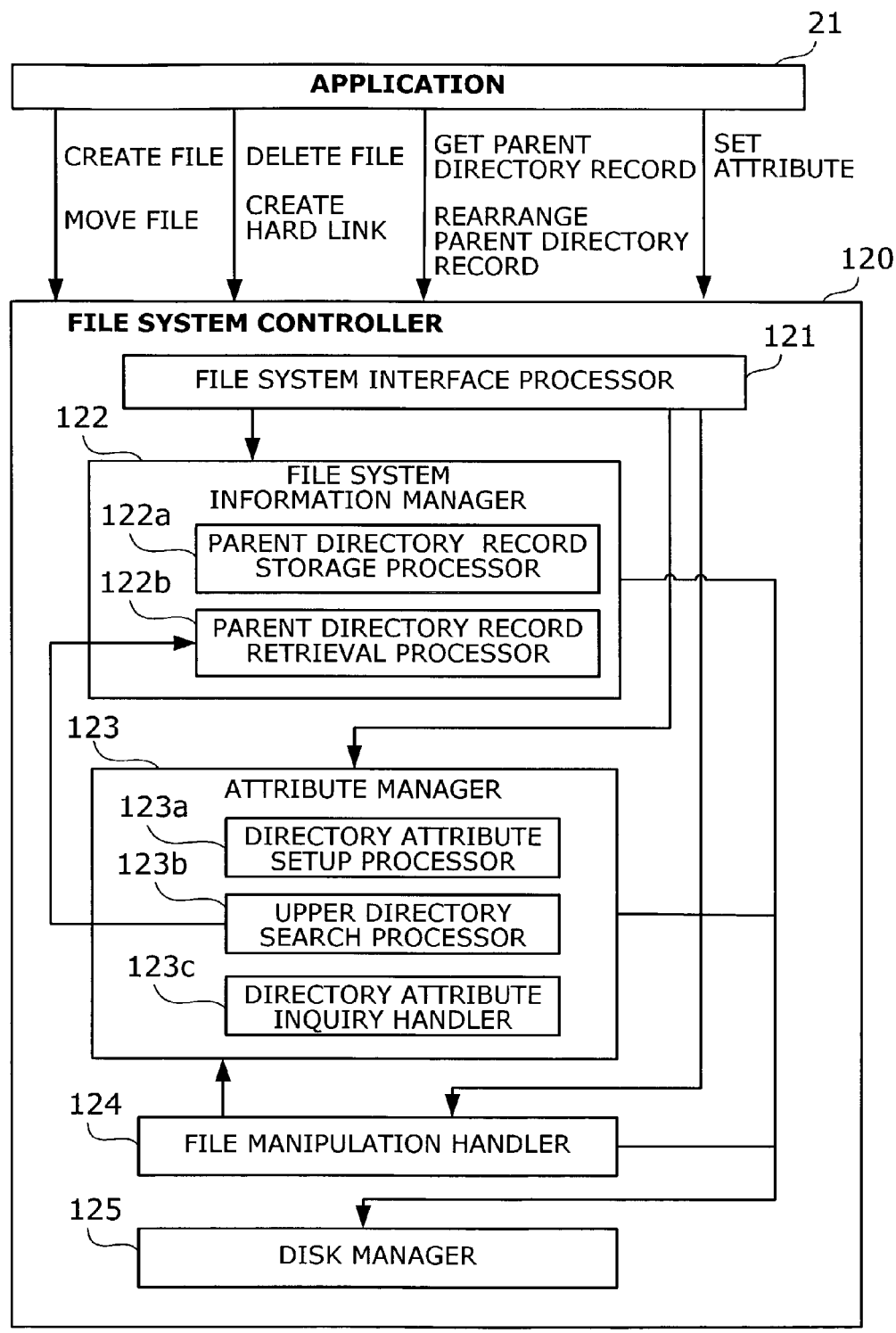
FIG. 7 shows how file manipulation commands are processed in the file system.
Figure 8:
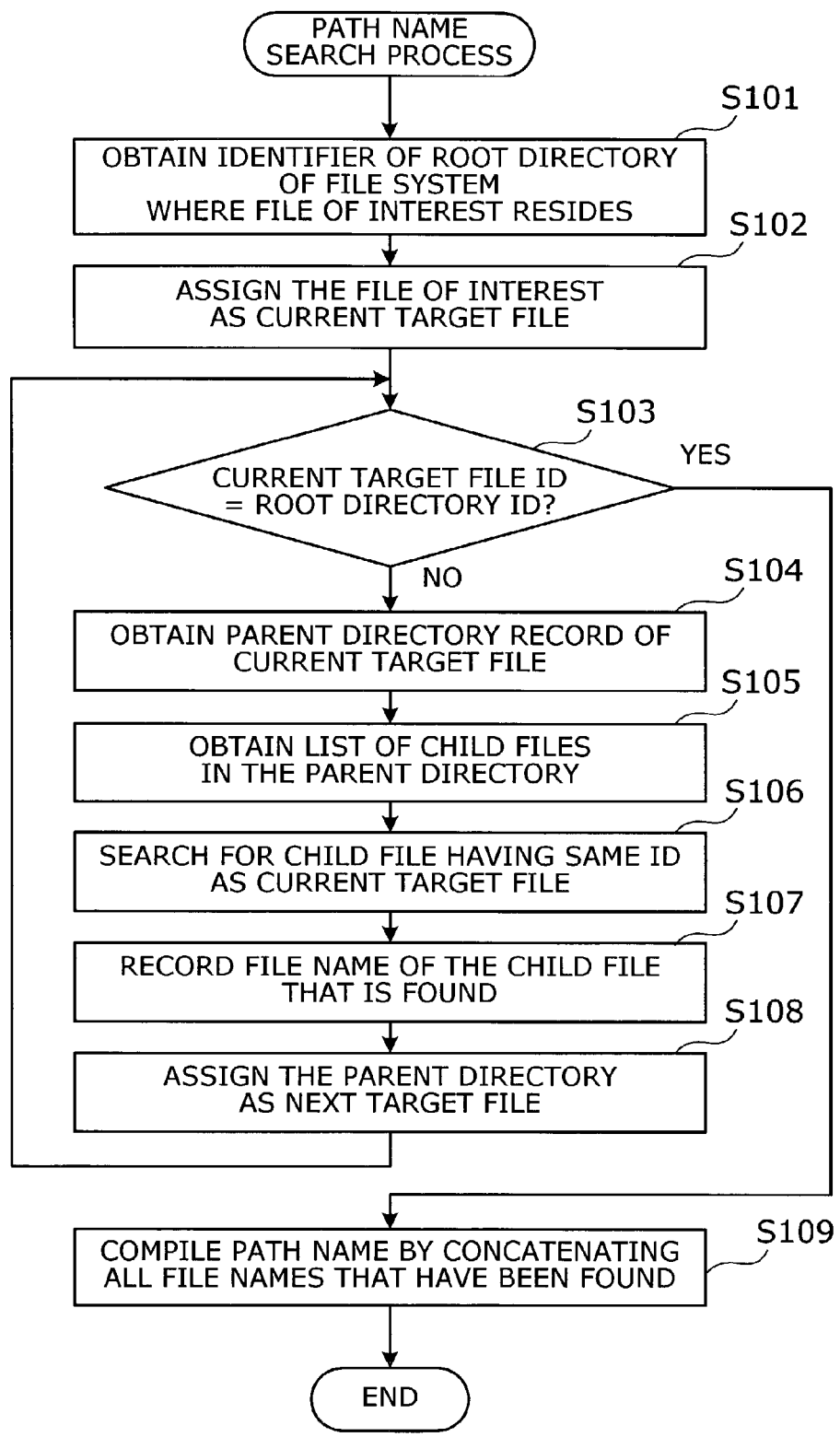
FIG. 8 is a flowchart of a path name search process.

Referring to FIGS. 7 and 8, this section describes how the file system performs path search, assuming that no hard links are included in the directory structure.

FIG. 7 shows how file manipulation commands are processed in the file system, where the arrows indicate the flow of commands (or processing requests) from their sources to destinations. While we have mentioned the file system information manager 122 and attribute manager 123 in FIG. 4, FIG. 7 presents their functions in greater depth to elaborate the present embodiment. On the other hand, FIG. 7 omits several elements that are transparent to the other elements. The omitted elements include: the network controller 22 in the client 20 and the network controller 110 in the NAS filer 100.

The file system information manager 122 comprises a parent directory record storage processor 122a and a parent directory record retrieval processor 122b. The parent directory record storage processor 122a stores parent directory records as part of the directory and file management records explained in FIG. 6. The parent directory record retrieval processor 122b deals with a parent directory inquiry by consulting the parent directory records and sending back a parent directory identifier that is retrieved from the relevant record. More specifically, the parent directory record retrieval processor 122b is activated when a parent directory inquiry arrives from an upper directory search processor 123b (described later) in the attribute manager 123. With reference to the parent directory records mentioned above, it searches for a record that shows which is the parent directory of the file (or directory) in question. The result is then sent back to the upper directory search processor 123b.

The attribute manager 123 comprises a directory attribute setup processor 123a, an upper directory search processor 123b, and a directory attribute inquiry handler 123c. The directory attribute setup processor 123a sets attribute values to a specified directory management record, according to an attribute value setting request received from the application 21 running on the client 20.

The upper directory search processor 123b performs path search for a specified file, according to a path search request received from the application 21 running on the client 20. When doing this, the upper directory search processor 123b consults the parent directory record retrieval processor 122b in the file system information manager 122, repetitively sending a parent directory inquiry until it reaches the root directory. In this way, the upper directory search processor 123b obtains the path from the root directory to the specified file.

The directory attribute inquiry handler 123c is activated by a request for directory attribute values received from the application 21. It reads out and returns attribute values of a specified directory in response to the request.

The application 21 issues various processing commands to the file system controller 120. They include: "Create File," "Move File," "Delete File," "Create Hard Link," "Get Parent Directory Record," "Rearrange Parent Directory Record," and "Set Attribute."

For file-handling operations such as "Create File" and "Move File," the application 21 issues a file manipulation command to the file system controller 120. This command is accepted by the file system interface processor 121 in the file system controller 120, which activates the file manipulation handler 124 to manipulate the specified file accordingly. The file system interface processor 121 further requests the file system information manager 122 to update the relevant file management record. It should be noted that this update request includes a command to update the parent directory record, unlike those in the conventional file systems.

Upon receipt of the above request, the file system information manager 122 commands the parent directory record storage processor 122a to update a relevant parent directory record, besides executing normal file management tasks such as writing the last updated date of the manipulated file. The parent directory record storage processor 122a then puts the parent directory identifier of the manipulated file to its file management record. More precisely, the parent directory record storage processor 122a requests the disk manager 125 to write the parent directory identifier into a storage area where the file management record of the manipulated file resides. The disk manager 125 then writes that parent directory identifier to an appropriate block of the HDDs 103, 103a, and 103b, which constitute the data storage subsystem 140.

In the way described above, the parent directory of a newly created file is registered to its file management record. When the file is moved to another directory, the file system updates the file management record with the identifier of its new parent directory. The file system also applies the same processing to newly created directories and move directories by keeping their directory management records up to date.

When the client needs the path name of a specific file, a parent directory inquiry for that file is issued from the application 21 to the file system controller 120. The inquiry is delivered to the file system information manager 122 through the file system interface processor 121. Upon receipt of the inquiry, the file system information manager 122 activates its parent directory record retrieval processor 122b, thereby retrieving a relevant file management record via the disk manager 125. It then extracts the parent directory record from the retrieved file management record, and sends it back to the requesting application 21 through the file system interface processor 121. By repeating the above inquiry until the root directory is reached, the application 21 obtains the path name of the file of interest.

FIG. 8 is a flowchart of the path name search process that has been outlined above. This process is executed according to the following steps, where files and directories are treated equivalently (i.e., the terms "target file," "child file," and "file name" can also mean "target directory," "child directory," and "directory name," respectively).

(S101) The application 21 obtains the root directory identifier of the file system where the file of interest resides.

(S102) The application 21 assigns the file of interest as the current target file.

(S103) The application 21 determines whether the identifier of the current target file agrees with the root directory identifier of the file system. If so, the process branches to step S109. If not, the process advances to step S104.

(S104) The application 21 sends a parent directory inquiry to the file system controller 120, thus obtaining the parent directory record of the current target file. The obtained parent directory record contains the parent directory identifier of the current target file.

(S105) Sending a request to the file system controller 120, the application 21 obtains such a list that describes what child files reside in the current parent directory. The obtained list includes the name and identifier of each child file (recall the description of directory management records in FIG. 6).

(S106) The application 21 searches the obtained list for a child file that has the same identifier as the current target file's. This step S106 always finds a hit because, by definition, the current target file resides in the current parent directory.

(S107) The application 21 records the file name of the child file that is found at step S106.

(S108) The application 21 assigns the current parent directory as the next target file, and then brings the process back to step S103.

Iterations of the above steps S103 to S108 enable the application 21 to receive a series of file names, moving from low level to high level of the directory structure.

(S109) Since it has been determined at step S103 that the identifier of the current target file agrees with the root directory identifier, the application 21 terminates the present process. The application 21 concatenates all the recorded file names in the order that they are obtained at step S107, thus producing the complete path name of the specified file.

The above processing steps permit the application 21 to obtain the path name of any file quickly and easily. While we have explained the flowchart of FIG. 8 as a task of the application 21, the process may also be implemented such that the file system controller 120 will execute most steps as its internal task. In this case, the application 21 has only to send a path name search request to the file system controller 120 and wait a response therefrom. The file system controller 120 actually executes the process explained in FIG. 8 and transmits the final result of step S109 (i.e., the complete path name) to the requesting application 21.

Path Search With Hard Link Support

Figure 9:
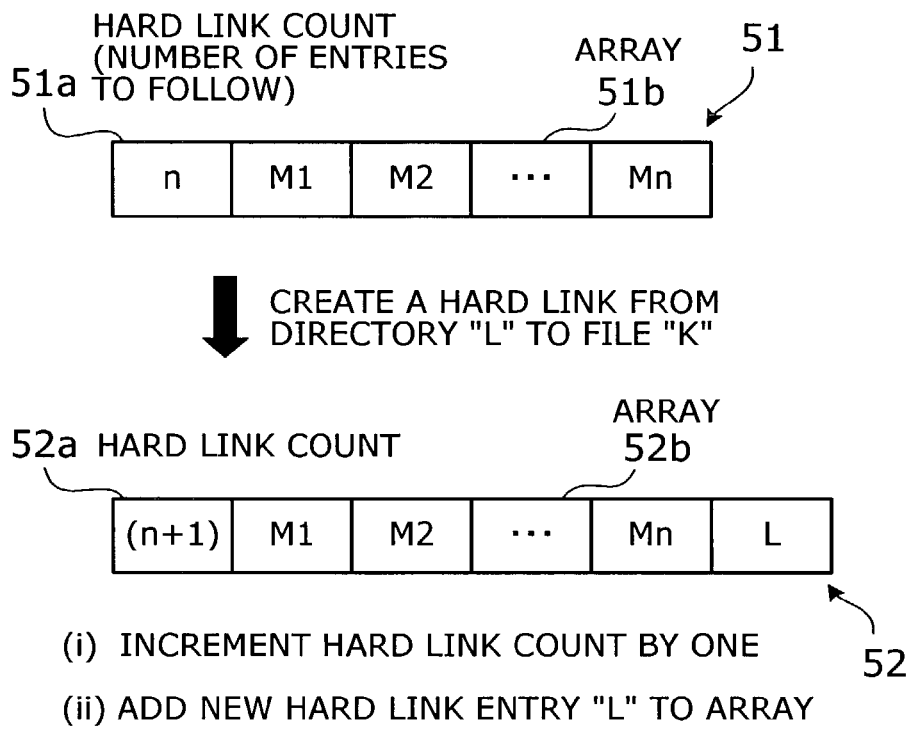
FIG. 9 shows how a parent directory record is changed when a new hard link is added.

Referring to FIG. 9, this section describes how the file management system performs path search, assuming that hard links are included in the directory structure. In the present embodiment, parent directory records in the management records of files and directories are manipulated to support hard links. Of the file manipulation commands, "Create File" is not affected by the used of hard links.

More specifically, to provide hard link functions, the parent directory record storage processor 122a has to control a plurality of parent directory identifiers according to the demand from the application 21. When moving a file to a different directory, the parent directory record storage processor 122a once removes the parent directory record from its previous storage area, and then re-registers a new parent directory record.

When a parent directory has a plurality of links, the identifier of that parent directory appears in as many parent directory records as the links. When a duplicate link is created as a result of relocation of a hard-linked file, the parent directory record storage processor 122a sorts out the links by deleting either entry from the parent directory record of that file. When canceling a link from a file, the parent directory record storage processor 122a deletes one entry from the relevant parent directory record of that file.

FIG. 9 shows how a parent directory record is changed when a new hard link is added. The upper half of FIG. 9 shows the parent directory record 51 of a file whose identifier is "K" (hence called file "K"), before it gains another hard link.

The parent directory record 51 consists of a plurality of data fields; the first field 51a contains the number of hard link entries, and it is followed by an array 51b of parent directory identifiers. The first field 51a is thus referred to as the "hard link count." In the original state, the hard link count 51a is n (n: natural number), and the parent directory identifier array 51b contains n entries: M1, M2, . . . Mn.

When a new hard link from a directory "L" to the file "K" is added, the hard link count 51a is incremented by one. Identifier "L" of the new hard link is appended at the end of the parent directory identifier array 51b. The lower half of FIG. 9 shows the updated parent directory record 52, where the updated hard link count 52a reads (n+1), and the updated array 52b contains (n+1) entries: M1, M2, . . . Mn, L.

If a parent directory inquiry is received from the application 21, the file system controller 120 activates the parent directory record retrieval processor 122b to examine the parent directory record 52, thus supplying the count value (n+1) and each parent directory identifier to the requesting application 21.

Figure 10:
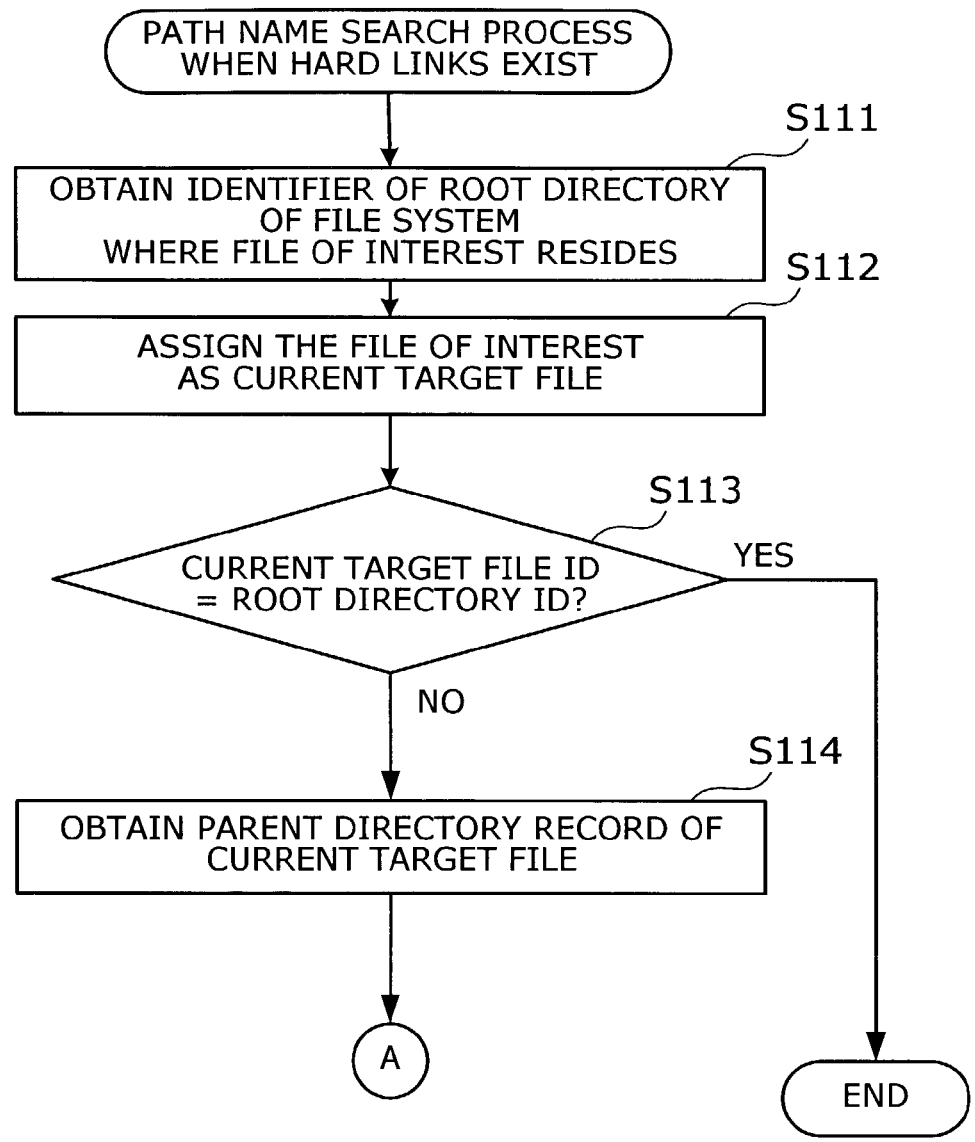
FIGS. 10 and 11 are the first and second halves of a flowchart that shows a path name search procedure when the file system includes hard links.

The following section describes how the application 21 finds the path name of a specific file. FIG. 10 is the first half of a flowchart that shows a path name search process when the file system includes hard links. This process is executed as follows:

(S111) By sending a query to the file system controller 120, the application 21 obtains the root directory identifier of the file system where the file of interest resides.

(S112) The application 21 assigns the file of interest as the current target file.

(S113) The application 21 determines whether the identifier of the current target file agrees with the root directory identifier of the file system. If so, the process is terminated. If not, the process advances to step S114.

(S114) The application 21 sends a parent directory inquiry to the file system controller 120, thereby obtaining the parent directory record of the current target file. The obtained parent directory record contains a plurality of parent directory identifiers of the current target file. The process proceeds to step S115 in FIG. 11 via connector "A."

Figure 11:
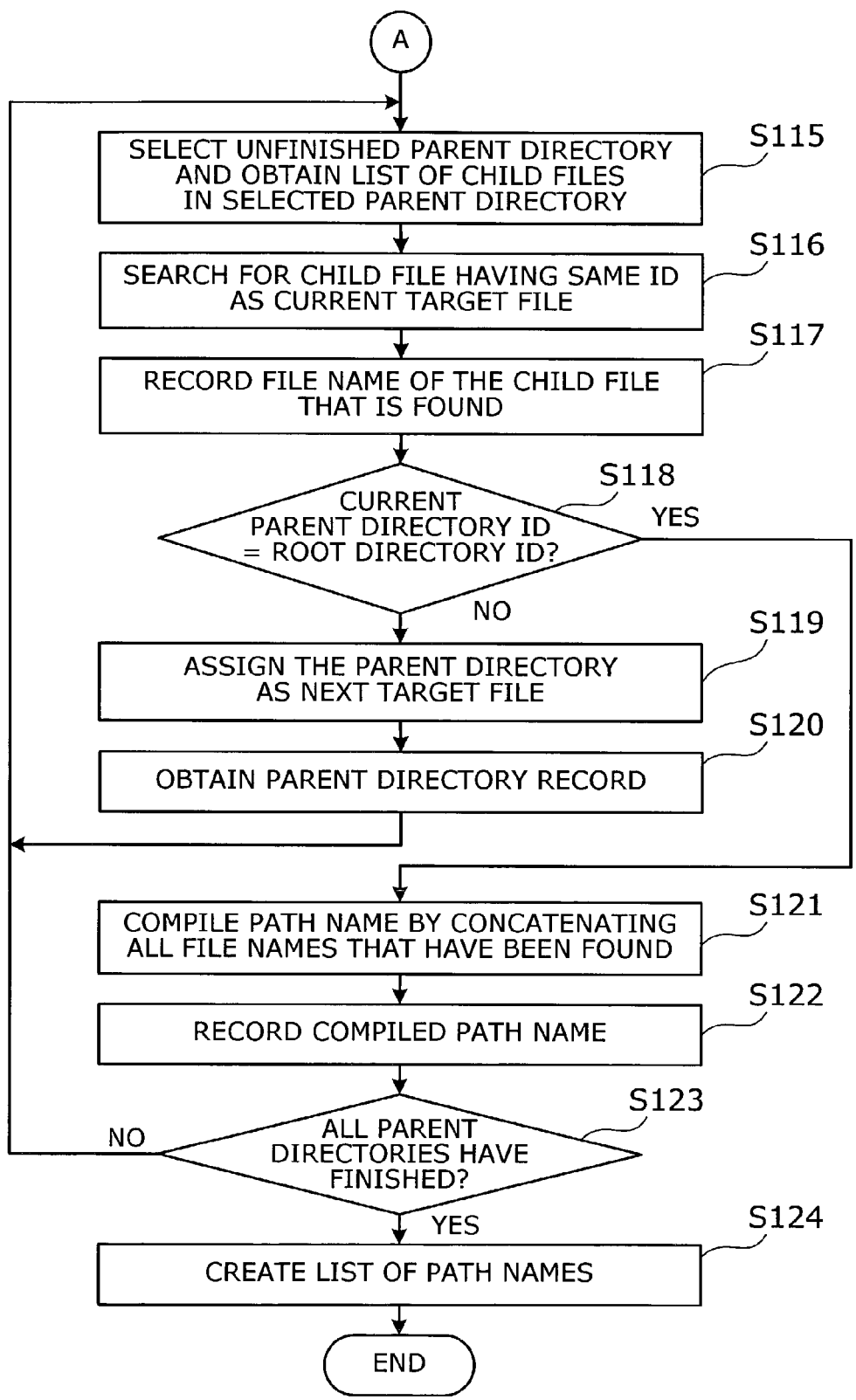

FIG. 11 shows the second half of the path name search process, which has the following steps:

(S115) Scanning the obtained parent directory record, the application 21 selects an unfinished parent directory. It then requests the file system controller 120 to provide a list of child files that reside in the selected parent directory. The obtained list includes the name and identifier of each child file.

(S116) The application 21 searches the obtained list for such a child file whose identifier is the same as the current target file's. This step S116 always finds a hit because, by definition, the current target file resides in the current parent directory.

(S117) The application 21 records the file name of the child file that is found at step S116.

(S118) The application 21 determines whether the identifier of the current target file agrees with the root directory identifier of the file system. If so, the process branches to step S121. If not, the process advances to step S119.

(S119) The application 21 assigns the current parent directory as the next target file.

(S120) The application 21 sends a parent directory inquiry to the file system controller 120, thereby obtaining the parent directory record of the next target file. After that, the process returns to step S115.

(S121) The application 21 concatenates all the recorded file names in the order that they are obtained at step S117, thus compiling the complete path name of the specified file.

(S122) The application 21 records the compiled path name. It then discards the previous records of file names obtained at step S117, since they are no longer necessary.

(S123) The application 21 determines whether it has finished the steps S115 to S122 for all the parent directories of the file of interest. If all finished, the process advances to step S124. If there are unfinished parent directory, the process goes back to step S115.

(S124) The application 21 compiles a list of path names that have been accumulated each time the step S122 is executed.

The above processing steps permit the application 21 to obtain a list of path names quickly and easily when the file of interest has hard links. The resultant list contains as many path names as the number of parent directories to which the file belongs.

While we have explained the flowchart of FIGS. 10 and 11 as a task of the application 21, the process may also be implemented such that the file system controller 120 will execute most steps as its internal task. In this case, the application 21 has only to send a path name search request to the file system controller 120 and wait a response therefrom. The file system controller 120 actually executes the process explained in FIGS. 10 and 11 and transmits the final result of step S124 (i.e., path name list) to the requesting application 21.

Prioritization of Parent Directories

When hard links exist, the file system offers a feature of prioritizing entries contained in the parent directory record of a specified file or directory. To provide this feature, the file system uses parent directory records stored in relevant file and directory management records.

Prioritization of parent directories is initiated by a "rearrange parent directory record" command issued from the application 21 to the file system controller 120. When this command is received, the file system controller 120 directs it to the parent directory record storage processor 122a. Examining the content of that command, the parent directory record storage processor 122a confirms that there is no missing parent directory record, and that the requesting application 21 has the privilege to alter the current setup of the record. After that, it rearranges the order of entries.

When a parent directory inquiry is received from the application 21, the file system controller 120 makes the parent directory record retrieval processor 122b output the requested parent directory record. More specifically, the parent directory record retrieval processor 122b outputs the number of entries and every record entry (parent directory identifier) in descending order of their priorities.

Referring again to FIG. 9, the parent directory record 51 contains a hard link count 51a and a parent directory identifier array 51b. The leftmost entry of the parent directory identifier array 51b has the highest priority, and the remaining entries are given successively lower priorities. When the order is revised by the application 21, the parent directory record storage processor 122a reconstructs the parent directory identifier array 51b in accordance with the new order. When outputting the parent directory identifiers in the parent directory record 51, the parent directory record retrieval processor 122b begins it with the leftmost entry of the parent directory identifier array 51b and then sends out the rest.

The above feature of the proposed file system introduces orderliness into the hard link information, which will be used in the management of file attributes (described in detail later), particularly to perform prioritized control of attributes of hard link files. If that two hard-linked directories have conflicting attributes, the file system uses the attributes of the higher-priority directory. Suppose, for example, that the higher-priority directory has an attribute that turns on the file compression option, while the lower-priority directory has the opposite. Although their attribute setups do not agree with each other, the file management system resolves this problem by choosing the option being set to the higher-priority directory, thus compressing the file that is hard-linked from those two directories.

In the way described above, the proposed file system maintains the consistency among a plurality of management record instances and substantive files by controlling them with reference to the priority of each parent directory. That is, the file management system would solve any conflict in attributes between different parent directories since it is designed to use the attributes of a higher-priority directory by default. This feature ensures that the attributes of a hard-linked file are always determinable, and thus it reduces the operating costs for monitoring errors.

Directory Attribute Setting

This section describes how the file system sets directory attributes. According to the present embodiment, lower-level directories under a certain directory can inherit attributes from that upper-level directory. The process of handing down a directory attribute involves the use of parent directory records of directories and files, in addition to the attribute information of each directory.

When an attribute setting request is received from the application 21, the file system controller 120 passes it to the directory attribute setup processor 123a in the attribute manager 123. Examining the content of that received request, the directory attribute setup processor 123a confirms that the requesting application 21 has the privilege to alter the current setup of directory attributes. After that, it updates relevant directories as requested.

When manipulating a given file, the attribute manager 123 searches the directory structure to find every ancestor directory that has an attribute, examining the parent directory records of files and directories until it reaches the root directory of the file system. The attribute manager 123 may reach the root directory without encountering such directories. If this is the case, and if a hard link is found on the way, the attribute manager 123 performs a similar search for the second and later parent directories of that hard link.

Each time an attribute is found in the process, the attribute manager 123 stops searching temporarily and executes a prescribed task about the attribute that is found. In this way, the attribute of an upper-level directory is applied to the given file or directory.

Figure 12:
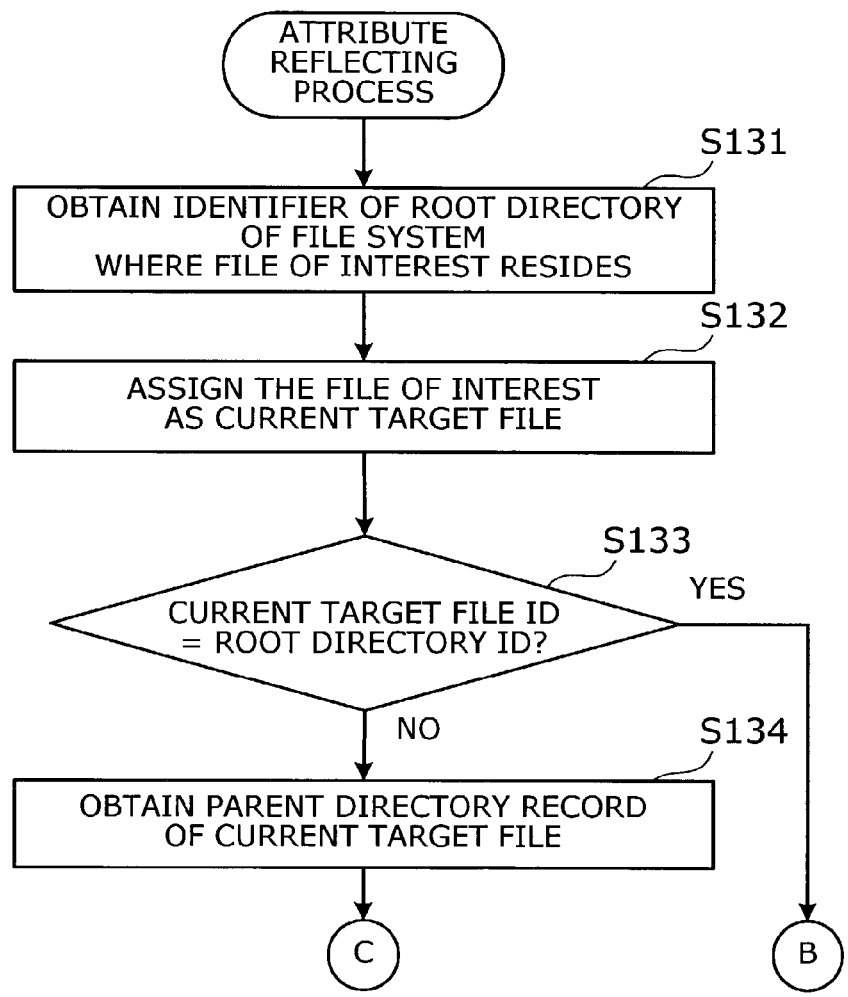
FIGS. 12 and 13 are the first and second halves of a flowchart that shows an attribute reflecting process.
Figure 13:
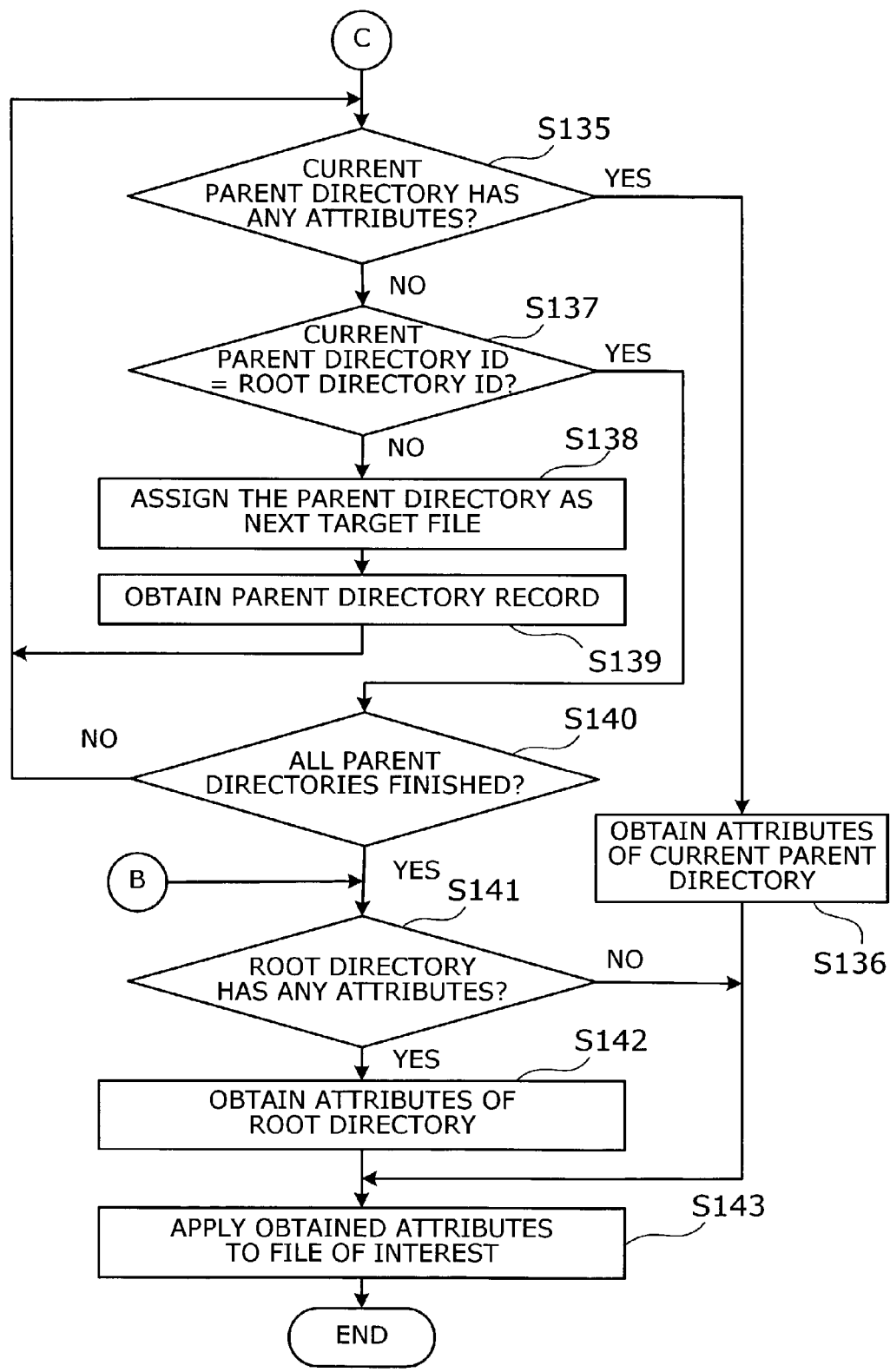

Referring next to FIGS. 12 and 13, the above-outlined attribute reflecting process is represented in flowchart form. FIG. 12 shows the first half of the process, which is initiated by the attribute manager 123 upon receipt of an attribute value request from the file manipulation handler 124. The reason why the file manipulation handler 124 needs attribute values is to determine what to do with a file manipulation command (e.g., "Create File," "Move File") received from the application 21. The process is executed according to the following steps:

(S131) Upon receipt of an attribute value request from the file manipulation handler 124, the upper directory search processor 123b in the attribute manager 123 interacts with the file system controller 120 to obtain the root directory identifier of a file system accommodating the file of interest (i.e., the file that is supposed to inherit directory attributes).

(S132) The directory attribute inquiry handler 123c assigns the file of interest as the current target file.

(S133) The directory attribute inquiry handler 123c determines whether the identifier of the current target file agrees with the root directory identifier of the file system. If so, the process proceeds to step S141 in FIG. 13 via connector "B." If not, the process advances to step S134.

(S134) The upper directory search processor 123b issues a parent directory inquiry to the file system controller 120, thereby obtaining the parent directory record of the current target file. The obtained parent directory record contains one or more parent directory identifiers. The process proceeds to step S135 in FIG. 13 via connector "C."

FIG. 13 shows the second half of the flowchart, where the process goes as follows:

(S135) Scanning the obtained parent directory record, the directory attribute inquiry handler 123c selects an unfinished parent directory. It then determines whether the selected parent directory (referred to as the "current parent directory") has any attribute. If so, the process branches to step S136. If not, the process advances to step S137.

(S136) The directory attribute inquiry handler 123c obtains the attribute(s) of the current parent directory. After that, the process advances to step S143.

(S137) The directory attribute inquiry handler 123*c* determines whether the identifier of the current parent directory agrees with the root directory identifier of the file system. If so, the process proceeds to step S140. If not, the process proceeds to step S138.

(S138) The directory attribute inquiry handler 123*c* assigns the current parent directory as the next target file.

(S139) The directory attribute inquiry handler 123*c* sends a parent directory inquiry to the file system controller 120, thereby obtaining the parent directory record of the next target file assigned at S138. The process then returns to step S135.

(S140) The directory attribute inquiry handler 123*c* determines whether it has finished the steps S135 to S139 for all parent directories of the file of interest. If all parent directories have finished, the process advances to step S141. If there are unfinished parent directory, the process returns to step S135.

(S141) The directory attribute inquiry handler 123*c* determines whether the root directory has any attributes. If it has, the process advances to step S142. If there are no attributes, the process skips to step S143.

(S142) The directory attribute inquiry handler 123*c* obtains the attributes of the root directory.

(S143) The directory attribute inquiry handler 123*c* sends out the attributes obtained at step S136 or S142 to the file manipulation handler 124 or application 21 for execution of a task according to each attribute specified.

Through the above processing steps, the file management system causes an attribute-related function assigned to a particular directory to exert its effect on the subordinate directories of that directory. When the directory has an attribute of, for example, file compression functions, the file system automatically compresses data of new files created under the directory itself and its subordinate directories. This feature enables attributes of an upper-level directory to be instantly reflected in real time, which has not been possible in conventional file management systems. It also permits a moved file to inherit attributes immediately from its new environment.

As in the present embodiment, the proposed file management system can be implemented in a NAS filer, which is accessible to a plurality of clients. Besides making it possible to provide a common set of file attributes to a plurality of clients, this NAS filer can also set node-specific attributes to a part of common file systems.

Management of Disk Quota

This section explains how the proposed system uses directory attributes to manage disk block usage in each individual directory. The following explanation starts with the concept of directory-based disk usage management.

Some conventional file systems provide a set of functions which control the number of files and/or the amount of file data for each individual user or group of users. Such functions are called "quota control," and each user or user group is previously assigned a fixed amount of disk space, or "disk quota." The quota control function limits the actual usage of disk blocks, based on the pre-assigned quota limits.

Those conventional file systems, however, limit the number of files or the amount of file data in the entire system; none of them have provided a function to limit the usage on an individual directory basis. To introduce this capability to the file management system, the present invention provides such directory attributes that control the file count and data amount in a particular directory.

Figure 14:
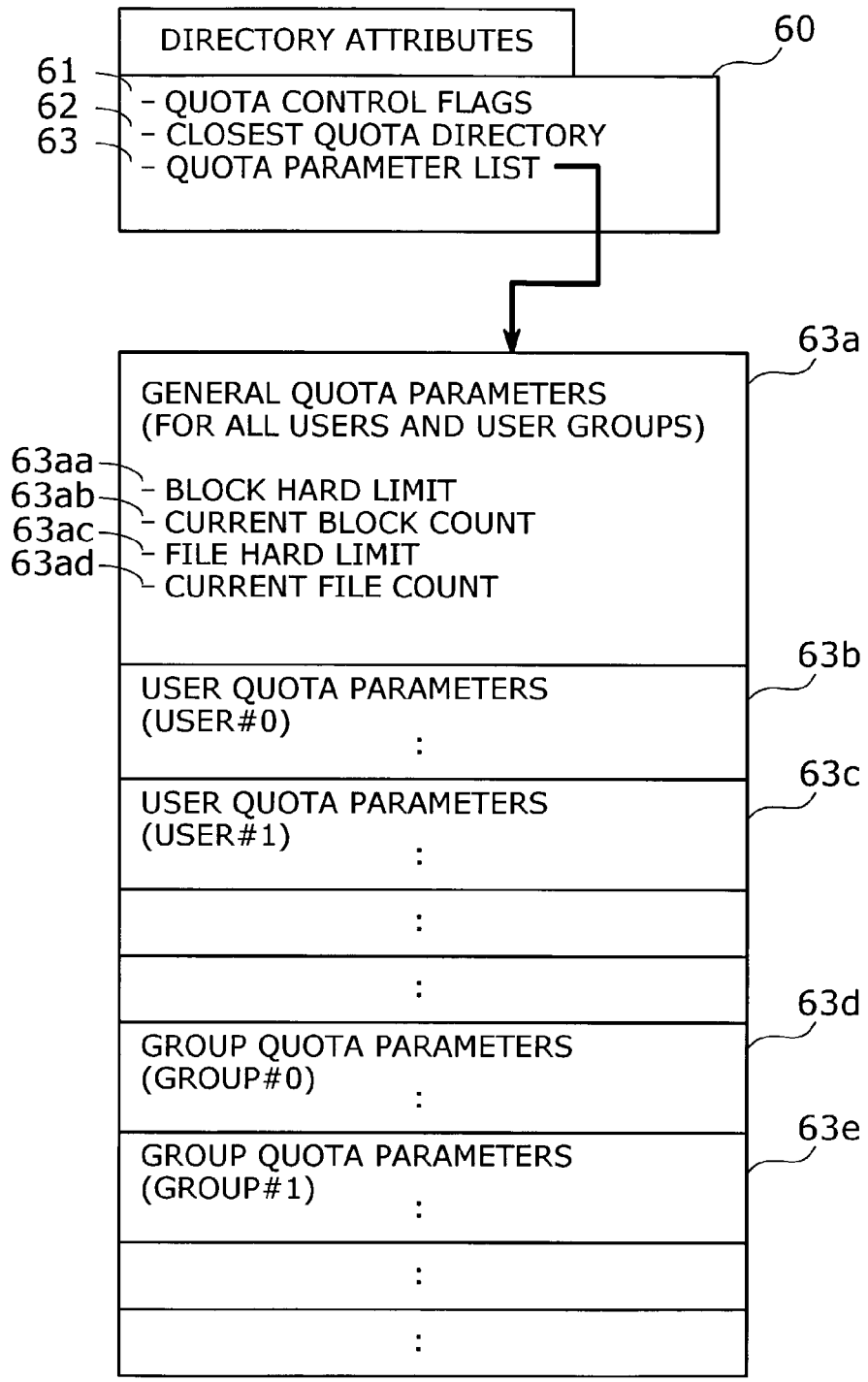
FIG. 14 shows a typical data structure of directory attributes when disk quota control takes place.

FIG. 14 shows a typical data structure of directory attributes when disk quota control takes place. This example attribute structure allows each directory to have a set of attributes 60, including: quota control flags 61, a closest quota directory identifier 62, a quota parameter list 63.

The quota control flags 61 are a collection of flags that indicate whether the present directory has active quota parameters for each user class. Here, the user class-based quota limits include: general limits, user-specific limits, and group-specific limits. The closest quota directory identifier 62 is the identifier (e.g., inode number in UNIX file systems) of an upper-level quota directory that is the closest to the present directory. The term "quota directory" refers to a directory where quota control takes place. The quota directories hold quota-related control data in their respective directory management records and other files linked thereto (described later in FIG. 18). Specifically, such control data resides in the quota parameter list 63, giving specific quota limits to each user class. The parameters also include indicators showing the current disk usage of each user class.

The quota parameter list 63 is divided into three sections as follows. The first section contains general quota parameters 63*a* covering all users and groups. The second section contains user quota parameters 63*b* and 63*c*, which are separately applied to individual users. The third section accommodates group quota parameters 63*d* and 63*e*, which are applied to each individual user group. The contents of the list will be explained more specifically below.

The general quota parameters 63*a* are for all individual users and user groups, which provide general quota limits and indicate the current usage of disk space. In the example of FIG. 14, this class of parameters include: block hard limit 63*aa* (hard limit for the number of blocks), current block count 63*ab* (the number of current blocks), file hard limit 63*ac* (hard limit for the number of files), and current file count 63*ad* (the number of current files).

The block hard limit 63*aa* sets the maximum disk capacity that is available to users and groups. More specifically, it refers to the maximum number of usable blocks, where the storage capacity of hard disks is divided into multiple blocks for management purposes. The current block count 63*ab* shows the current usage of storage capacity, i.e., the total amount of user files stored under the directory (including all subdirectories thereof) to which the directory attributes 60 are set.

The file hard limit 63*ac* sets the maximum number of files that the users and groups are allowed to create. The current file count 63*ad* is the number of existing user files, i.e., the total number of user files stored under the directory (including all subdirectories thereof) to which the directory attributes 60 are set.

The user quota parameters 63*b* and 63*c* also include the same set of parameters as those in the general quota parameters 63*a*, while the scope of current block count and current file count is narrowed to the files owned by each individual user (i.e., file owner) #0, #1, and so on. The directory attributes 60 includes such user quota parameters 63*b* and 63*c* only when the disk capacity has to be managed user by user.

Similar to the above, the group quota parameters 63*d* and 63*e* also include the same set of parameters as those in the general quota parameters 63*a*, while the scope of current block count and current file count is narrowed to the files owned by the members of a particular user group #0, #1, and so on. The directory attributes 60 includes such group quota parameters 63d and 63e only when the disk capacity has to be managed group by group.

As seen from the above definitions, the current block count 63ab and current file count 63ad, as well as all those instances in three sections of the quota parameter list 63, indicate the present status of disk space usage. For this reason, they will be collectively termed "current usage status" where appropriate.

Figure 15A:
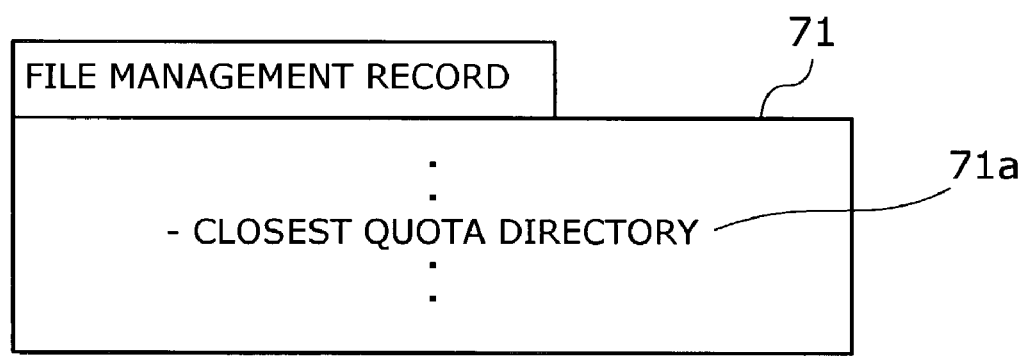
FIGS. 15(A) and 15(B) shows a typical structure of file management data when disk quota control takes place, the former representing the case without hard links and the latter the case with hard links.
Figure 15B:
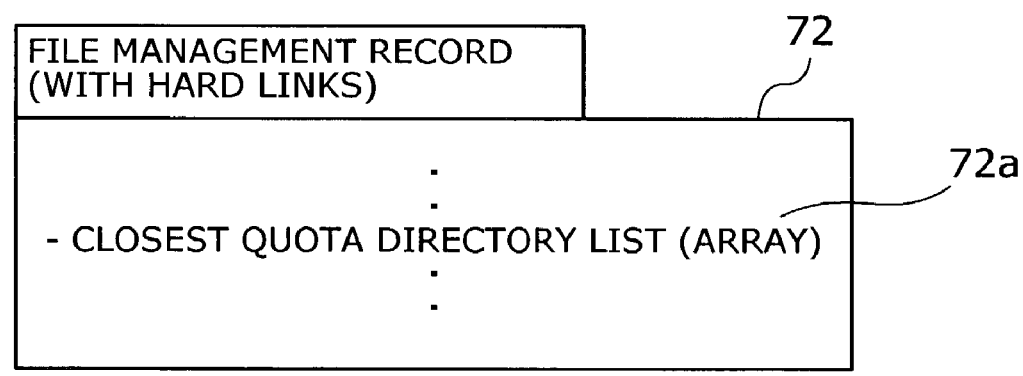

FIGS. 15(A) and 15(B) show a typical structure of file management data when disk quota control takes place. More particularly, FIG. 15(A) represents a file management record 71 in the case without hard links, while FIG. 15(B) represents another file management record 72 in the case with hard links.

When a file has no hard link, its file management record 71 contains a closest quota directory identifier 71a, which indicates which one is the closest of all quota directories above that file. On the other hand, when a file has hard links, its file management record 72 contains a closest quota directory list 72a, which is a collection of directory identifiers each indicating the closest quota directory above that file.

As seen from the above, the proposed file management system puts a closest quota directory identifier(s) to the management record of every file and directory, so as to indicate the presence of an upper-layer quota directory closest to the present file or directory. Limits to that quota directory will affect the usage of the present file or directory. If no such directories exist, the management record would have a flag that indicates the absence of closest quota directories.

Thanks to the file and directory management records configured as such, a list of quota directories can be created easily by tracing the directory structure from a particular directory up to the root directory. When a file is hard-linked to a plurality of directories, the closest quota directory in each hard link is determined. Accordingly, the management record of such a hard-linked file will have a plurality of closest quota directory identifiers.

The directory attributes 60 shown in FIG. 14 are updated each time a file system commands such as "Create File," "Delete File," "Allocate Blocks," and "Deallocate Blocks" is executed. This is because such commands necessitate an update to the current usage status. When executing a "Create File" command, the file management system checks relevant quota parameters beforehand, not to exceed the limit.

In the case where the user-based quota control is applicable, each user's file manipulation will initiate an update to relevant user quota parameters with a new file count or new block count. The file management system examines each user's quota limit before executing such a command as "Create File" or "Allocate Blocks." If an excess is expected, the system may impose an appropriate restriction on that command.

Similarly to the above, the system refers to a group quota, when a group member attempts a file manipulation command, and its relevant group quota parameters are updated with a new file count or new block count. The system also examines each group's quota limit before executing such a command as "Create File" or "Allocate Blocks." If an excess is expected, the system may impose an appropriate restriction on that command.

Figure 16:
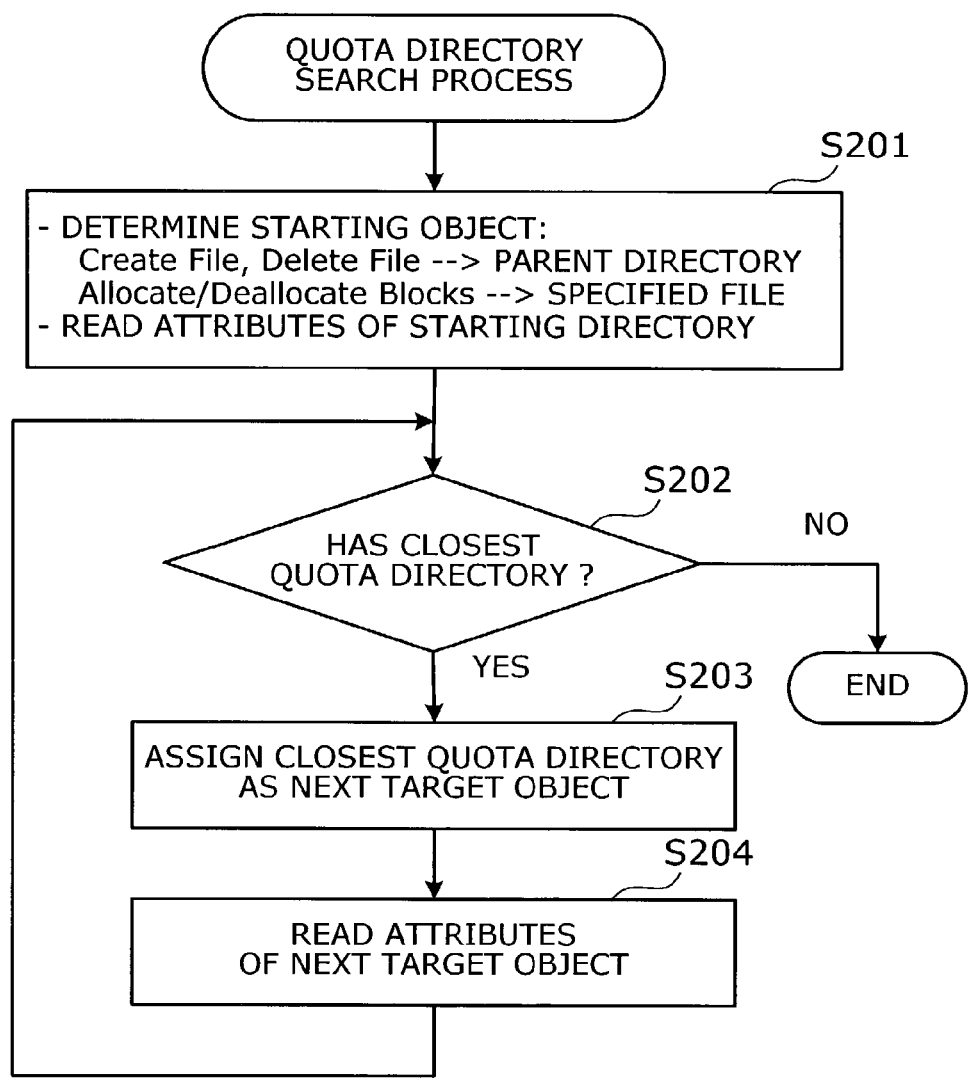
FIG. 16 is a flowchart of a process of updating current usage status and searching for relevant quota directories.

The closest quota directory identifier(s) stored in each directory's management record is used to find a relevant upper-level directory(ies) to obtain a set of quota parameters that need to be updated or applied. FIG. 16 is a flowchart of a quota directory search process that finds such a directory (ies) to update the current usage status, as well as to refer to the block hard limit and file hard limit. This process is executed according to the following steps:

(S201) The file system controller 120 determines where to start from, a file or a directory. In the case the given command is "Create File" or "Delete File," the parent directory of the specified file will be the starting point of the search process. When the command is "Allocate Blocks" or "Deallocate Blocks," the specified file will be the starting point of the search process. The file system controller 120 assigns the determined file or directory as the starting target object. In the case the search process is started from a directory, the file system controller 120 reads the attribute information of that directory.

(S202) By checking the presence of a closest quota directory identifier(s), the file system controller 120 determines whether the current target object has a closest quota directory(ies). If it has, the process advances to step S203. If not, the process is terminated.

(S203) The file system controller 120 identifies the directory by using the closest quota directory identifier found at step S202, and assigns it as the next target object.

(S204) The file system controller 120 reads the attribute information of the next target object, and then it returns to step S202.

Through the above processing steps, the file management system traces the directory structure from a specified file or its parent directory, thereby obtaining the attributes of all relevant quota directories located above the starting object. If the specified file is hard-linked to a plurality of directories, its file management record must have a plurality of closest quota directory identifiers as shown in FIG. 15(B). If this is the case, the file management system repeats the above-described process to search for upper-level quota directories for every hard link, although the flowchart of FIG. 16 does not explain this case explicitly.

File Manipulation Under Quota Control

This section presents more specific examples of file manipulation command processing under disk quota control.

Figure 17:
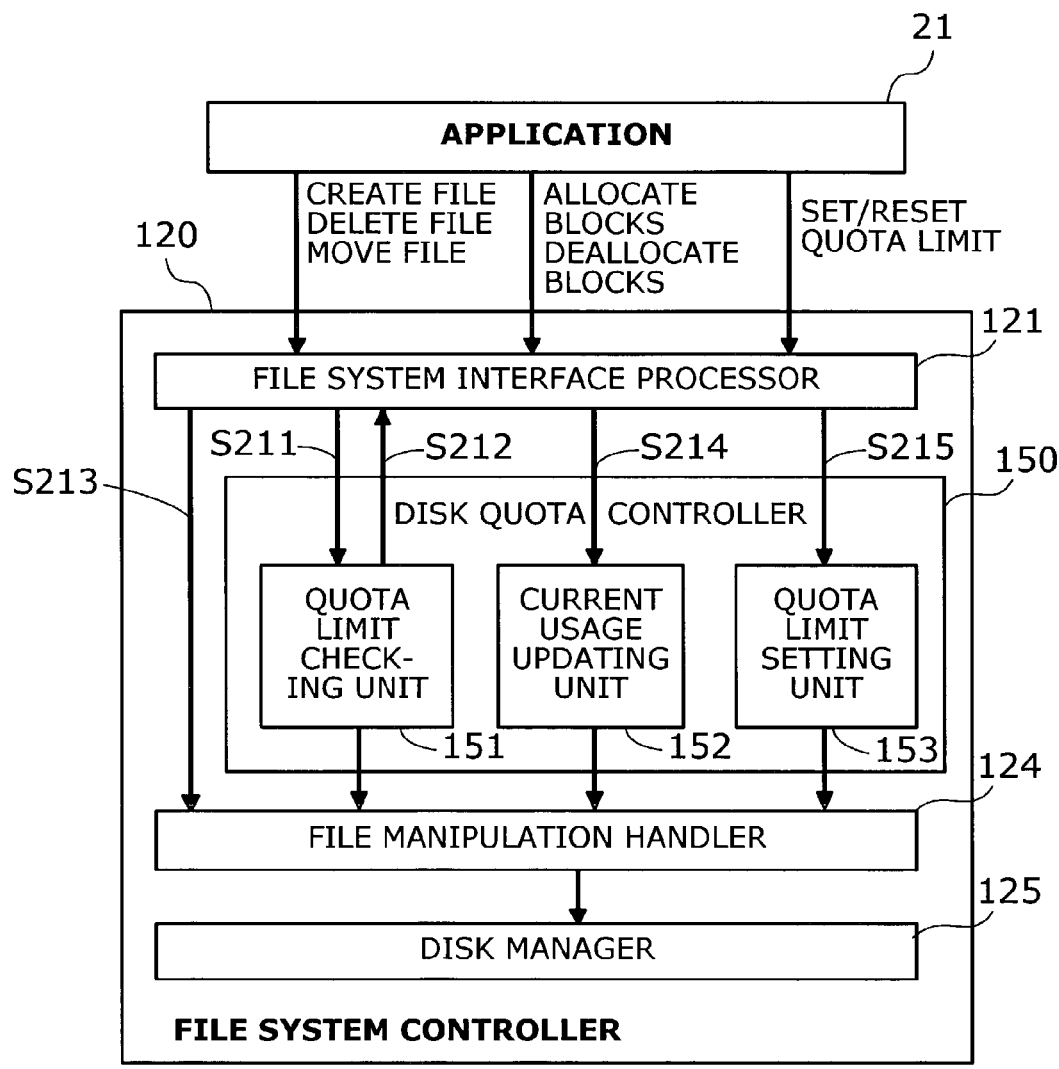
FIG. 17 is a functional block diagram which shows how the disk quota control is implemented.

FIG. 17 is a functional block diagram which shows how the disk quota control is implemented, where the arrows indicate the flow of control, as opposed to data flows. FIG. 17 shows the following quota-sensitive commands issued from the application 21: "Create File," "Delete File," "Move File," "Allocate Blocks," "Deallocate Blocks," "Set/Reset Quota Limit." These commands are once received by the file system interface processor 121, and distributed to the file manipulation handler 124 and disk quota controller 150 in the file system controller 120.

The disk quota controller 150 manages the process of file manipulation in the file system, based on the block hard limit and file hard limit determined for each individual directory. To provide this service, the disk quota controller 150 comprises a quota limit checking unit 151, a current usage updating unit 152, and a quota limit setting unit 153.

The quota limit checking unit 151 calculates the consumption of disk blocks and evaluates it in the light of the quota limit, when a file manipulation command such as "Create File" is issued from the application 21. If it is within the limit, the quota limit checking unit 151 grants permission to the file manipulation handler 124, thus authorizing the use of disk blocks. If it is expected to violate the limit, the quota limit checking unit 151 does not allow the file manipulation handler 124 to execute the command.

The current usage updating unit 152 is also activated by file manipulation commands such as "Create File" from the application 21. When the file manipulation handler 124 has finished a command about a particular file, the current usage updating unit 152 updates the current usage status of every relevant upper-level directory. The quota limit setting unit 153 sets or resets quota parameters according to "Allocate Blocks" and "Deallocate Blocks" commands sent from the application 21.

The disk quota controller 150 is implemented as one of the functions of the attribute manager 123 shown in FIG. 4. That is, the attribute manager 123 is supposed to be responsible for quota management, because, according to the present invention, this feature is integrated with the attribute functions. Or alternatively, it would also be possible to implement some quota management functions (e.g., closest quota directory search) as part of the file system information manager 122.

Some commands such as "Create File" and "Allocate Blocks" would increase the usage of disk quota, thus necessitating an update request to the file system. The system of FIG. 17 handles such an update by first passing control to the quota limit checking unit 151 (step S211). The quota limit checking unit 151 compares the expected disk usage with the present quota parameter values, thus determining whether the resulting amount would exceed the limit. If the estimate is safely within the limit, the quota limit checking unit 151 transfers control back to the file system interface processor 121 (step S212).

Now that the given command is executable, this causes the file system interface processor 121 to send a file system update request to the file manipulation handler 124 (step S213). The file manipulation handler 124 interacts with the disk manager 125 to update the file system accordingly. In synchronization with this update, the file system interface processor 121 requests the current usage updating unit 152 to update the current usage status (step S214). The current usage updating unit 152 updates the current usage status through interaction with the file manipulation handler 124 and disk manager 125.

A command "Set/Reset Quota Limit" for a specific directory causes the file system interface processor 121 to transfer control to the quota limit setting unit 153 (step S215). The quota limit setting unit 153 sets new quota limits or resets the existing quota limits, accordingly.

Data Structure for Quota Control

Figure 18:
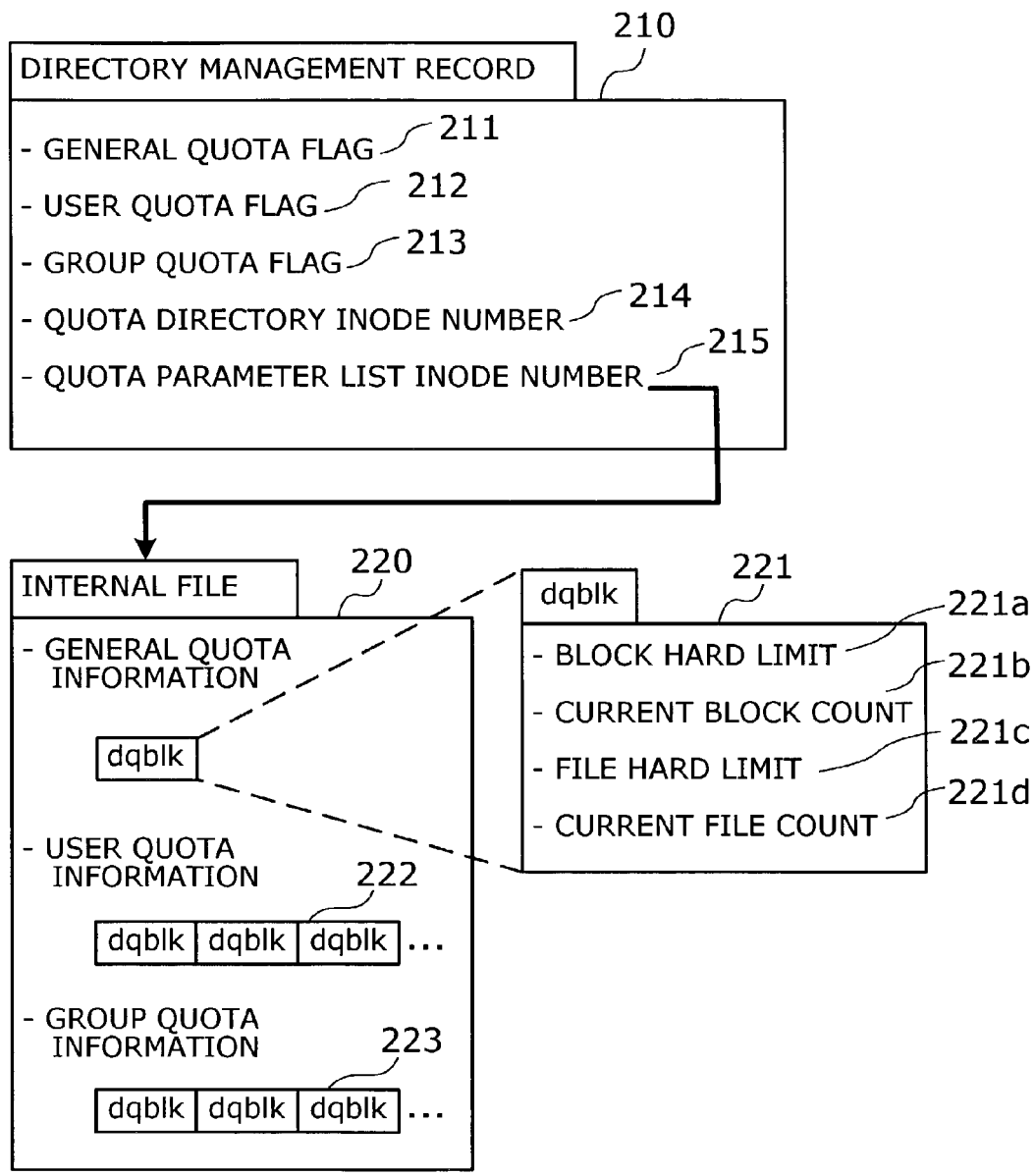
FIG. 18 shows an example of directory data structure which enables quota control.

This section describes data structure that enables quota control according to the present invention. FIG. 18 shows an example of a directory management record, with the focus on such data items that relates to quota control.

The illustrated directory management record 210 includes the following information fields describing a specific directory: general quota flag 211, user quota flag 212, group quota flag 213, quota directory inode number 214, and quota parameter list inode number 215.

The general quota flag 211 is a single-bit flag that indicates whether the directory is controlled in terms of the number of files and amount of storage space. If the directory is quota-controlled, this flag 211 is set to one.

The user quota flag 212 is a single-bit flag that indicates whether the directory is quota-controlled on an individual user basis. If the directory is under the user quota control, this flag 212 is set to one.

The group quota flag 213 is a single-bit flag that indicates whether the directory is quota-controlled on an individual group basis. If the directory is under the group quota control, this flag 213 is set to one.

The quota directory inode number 214 is the inode number of an upper-level quota directory that is the closest to the present directory. When there are no such upper-level quota directories, the directory management record 210 of the present directory has a value of zero in the quota directory inode number field 214, indicating that the present directory is not subject to quota control.

The quota parameter list inode number 215 is the inode number representing an internal file 220 that contains a list of quota control parameters such as current usage status and quota limits. When either of the general quota flag 211, user quota flag 212, and group quota flag 213 is set to one (i.e., when the present directory is a quota directory), the inode number of the internal file 220 is set to the quota parameter list inode number 215. If none of those flags 211, 212, and 213 are set, then it means that the present directory is not a quota directory, and thus the quota parameter list inode number 215 is set to zero.

The internal file 220 is a system-level file, which does not belong to any directories, unlike normal directories or files. For this reason, general users cannot locate it with a simple file listing command, such as "ls" in UNIX systems. Included in the internal file 220 are: general quota information 221, user quota information 222, and group quota information 223.

The general quota information 221 shows the current usage status values and quota limit parameters about the number of files and the amount of file data in the present directory and its subordinates. More specifically, they include: block hard limit 221$a$, current block count 221$b$, file hard limit 221$c$, and current file count 221$d$. The block hard limit 221$a$ sets the maximum number of disk blocks that is available to users and groups, in the present directory and its subordinates. The current block count 221$b$ shows the current usage of disk blocks in the present directory and its subordinates. The file hard limit 221$c$ sets the maximum number of files that the users and groups are allowed to create in the present directory and its subordinates. The current file count 221$d$ indicates the number of existing files in the present directory and its subordinates.

As seen from above, the current usage status values and quota limit parameters about the number of files and the amount of file data are managed in a structure consisting of specific elements 221$a$ to 221$d$. This structured data set will now be called "dqblk structure."

The user quota information 222 is a collection of dqblk structures, like that of the general quota information 221, each of which corresponds to a particular user. It differs from the user quota information 222 in that the scope of current block count and current file count is narrowed to the files owned by each individual user.

The group quota information 223 is also a collection of dqblk structures, like that of the general quota information 221, each of which corresponds to a particular group of users. It differs from the user quota information 222 in that the scope of current block count and current file count is narrowed to the files owned by the members of each individual group.

The general quota information 221 is recorded at the top of the internal file 220 (i.e., its offset from the top is zero). The user quota information 222 of a particular user is located in the internal file 220 with an offset of (uid+1)×size_dqblk, where uid is a natural number (=1,2,3. . . ) identifying that particular user, and size_dqblk the data size of a dqblk structure. Likewise, the group quota information 223 of a particular group is located in the internal file 220 with an offset of (gid+(uid_max+1)+1)×size_dqblk, where gid a natural number (=1,2,3...) identifying that particular group, and uid_max is the maximum value of uid that the file system permits. As such, every piece of quota information can be located easily from the user identifier uid or group identifier gid.

While the illustrated internal file 220 contains dqblk structures for all users and groups, the file management system may update the current usage status only in those having valid quota limit values. Or alternatively, the directory management record 210 may be implemented such that only quota-limited users and groups should have their dqblk entries in the internal file 220.

Figure 19:
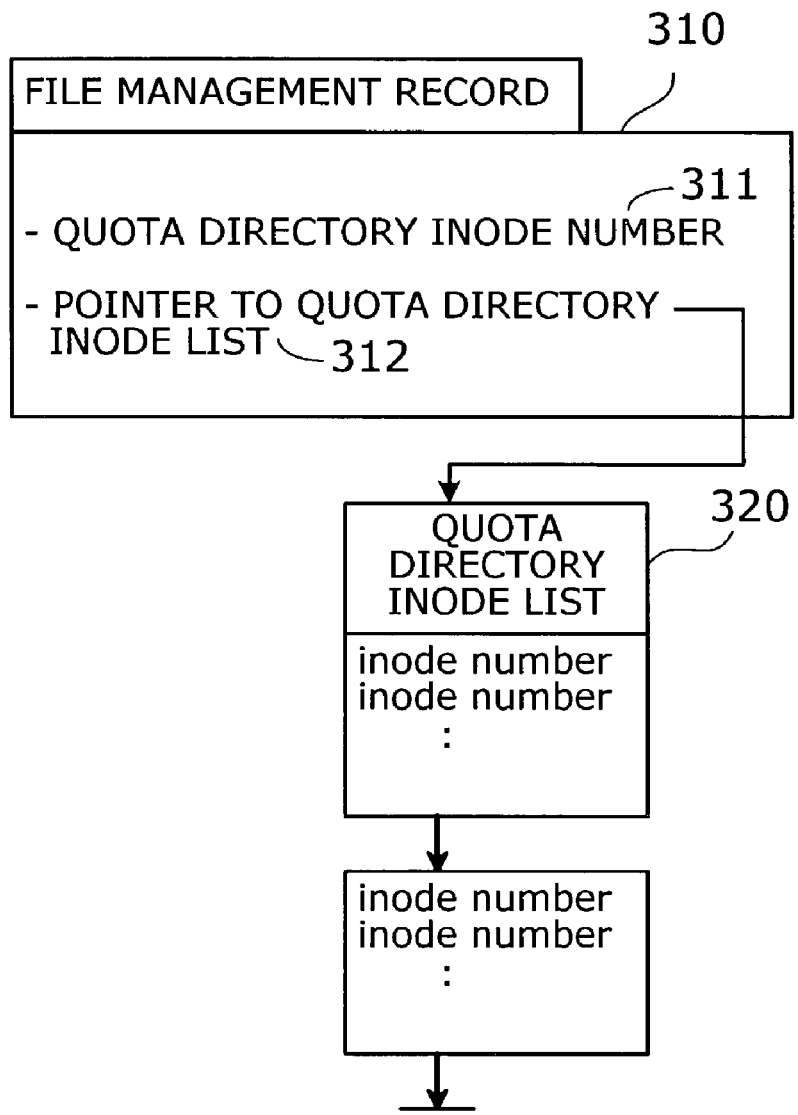
FIG. 19 shows an example of file data structure which enables quota control.

FIG. 19 shows an example of file management record structure, with the focus on such data items that relates to quota control. To quota management about a specific file, its file management record 310 includes a quota directory inode number 311 and a pointer 312 directed to a quota directory inode list The quota directory inode number 311 is the inode number of an upper-level quota directory that is the closest to the present file. That is, the quota directory inode number 311 indicates such an upper-level quota directory that is the closest to the present file among the quota-limited directories located above the present file in the directory structure. When no such directories exist, the file management record 310 of the present file has a value of zero in the quota directory inode number field 311, meaning that the present file is not subject to quota control.

The pointer 312 is linked to a file 320 containing a list of inode numbers of upper-level quota directories, which is thus named "quota directory inode list." This pointer 312 is employed only when the present file is hard-linked with two or more parent directories, because the quota directory inode number field 311 would otherwise be sufficient for a file without hard links. When the present file has hard links, the quota directory inode list 320 is created and entered the inode number of a closest upper-level quota-limited directory with respect to each individual hard link. Thus, the quota directory inode list 320 of the present file contains as many inode numbers as it has hard links.

Figure 20:
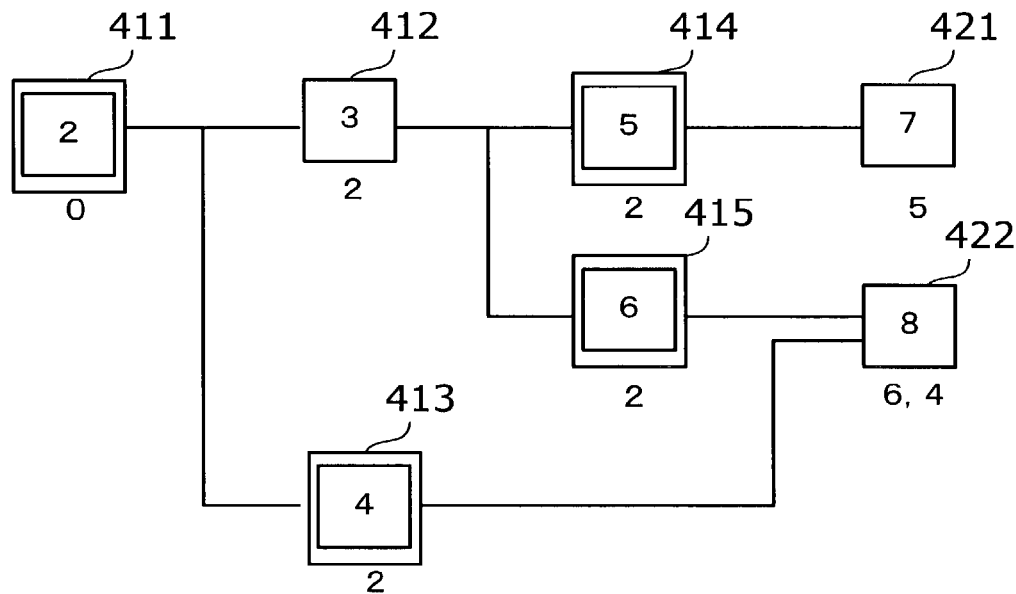
FIG. 20 shows an example of a directory tree.
Figure 20:
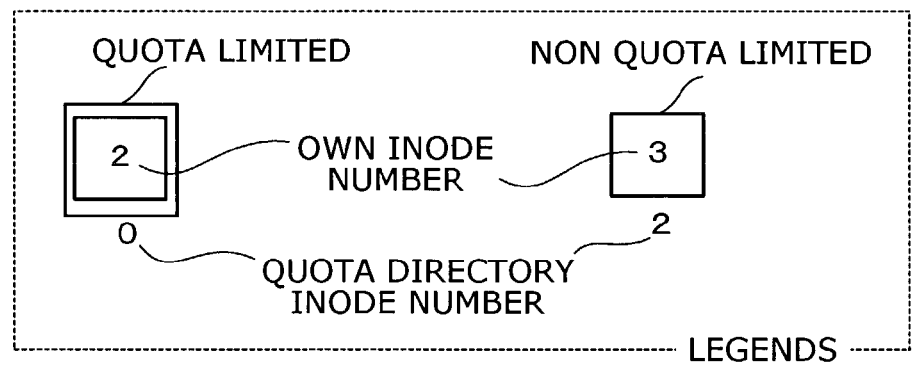

Referring now to FIG. 20, the following will describe a specific process of identifying and setting a quota directory inode number for a given directory or file.

FIG. 20 shows an example of a directory tree, where a plurality of directories 411 to 415 and files 421 and 422 are depicted in a horizontal tree structure, the leftmost node being the highest in the hierarchy. In this tree diagram, the double-line boxes represent quota-limited directories 411, 413, and 414 and 415, while single-line boxes show non-quota-limited directories and files. The lines linking those boxes indicate a parent-child relationship, the parent on the left and the child on the right.

The directories 411 to 415 and files 421 and 422 are identified by inode numbers, which are shown in their respective boxes. Written below each box is the quota directory inode number, which indicates an upper-level quota-limited directory that the closest to each directory or file. The above notation for directory trees is applied also to similar diagrams which will be explained later in FIGS. 26 to 29.

The leftmost directory 411, the root directory in the example structure of FIG. 20, has quota limits. This directory 411 is identified by its inode number "2" and has a quota directory inode number "0" since the root directory has no directories above itself.

Two child directories 412 and 413 are located immediately below the root directory 411. The former directory 412 has no explicit quota limits. It is identified by an inode number "3" and has a quota directory inode number "2." The other child directory 413 is quota limited. It is identified by an inode number "4" and has a quota directory inode number "2."

The directory 412 has two immediate child directories 414 and 415, both of which have quota limits. The former directory 414 is identified by its inode number "5," while the latter directory 415 is identified by its inode number "6." Both directories 415 and 416 have a quota directory inode number "2."

Immediately below the directory 414 is a file 421, whose own inode number is "7" and quota directory inode number is "5." Another file 422 is located immediately below the directory 415. The file 422 is also hard-linked to another directory 413, meaning that it is an immediate child of two directories 413 and 415. The file 422 is identified by its inode number "8" and has two quota directory inode numbers "6" and "4."

With the above-described structure, the file management system can create a list of quota directories related to each file 421 and 422, examining their ancestor directories. Take the file 421, for example. The system first obtains the inode number "5" (i.e., directory 414) from the file 421's quota directory inode number field. Referring then to the directory 414's quota directory inode number field, the system obtains another relevant inode number "2" (i.e., directory 411). The system examines the quota directory inode number field of the directory 411, ending up with an inode number of zero, meaning that no upper-level quota directory is present. The system has now obtained a list of inode numbers ("5," "2"), which would affect manipulation of the file 421.

The file 422, on the other hand, has two links, one from the directory 415 and the other from the directory 413. Its quota directory inode numbers "6" and "4" requires the system to trace two paths individually to find out relevant ancestor directories This results in two lists, ("6," "2") and ("4," "2"), which would affect manipulation of the file 422.

We have explained that the system terminates the search when it has encountered a zero-valued quota directory inode number. Alternatively, one could modify the process in such a way that the search will be terminated upon finishing the root directory.

Updates to Current Usage Status

This section provides the details of how the file management system updates the current usage status.

Some class of file manipulation commands, including "Create File," "Delete File," "Allocate Blocks" or "Deallocate Blocks" would change the usage status of storage resources, thus necessitating updates to management records of related directories.

Figure 21:
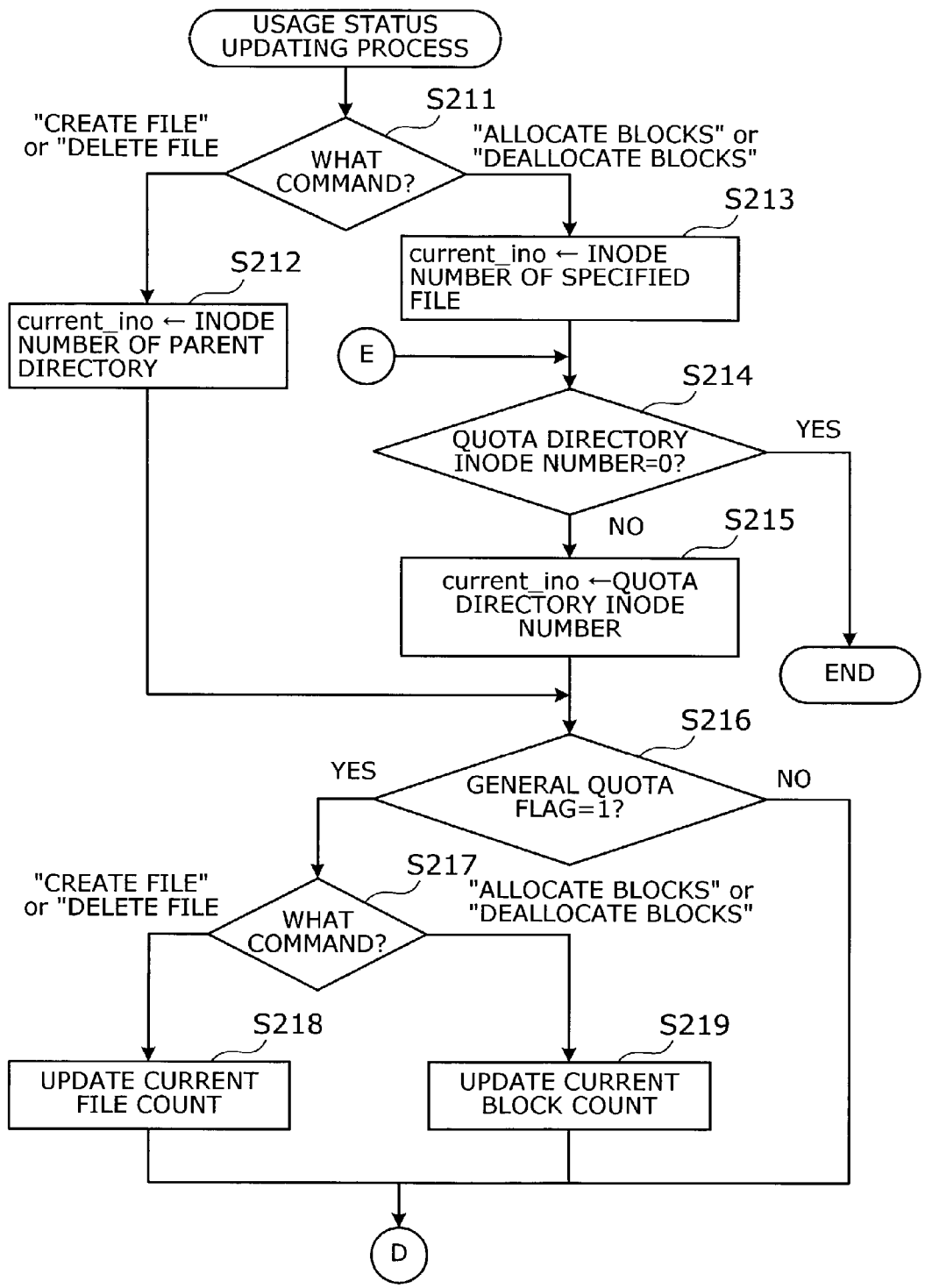
FIGS. 21 and 22 are the first and second halves of a flowchart showing how the current usage status is updated.

FIG. 21 is the first half of a flowchart showing how the system update the current usage status after it has executed the above-mentioned commands. The process advances according to the following steps:

(S211) The current usage updating unit 152 determines whether the executed file manipulation command is either "Create File" or "Delete File" or not. If it is either "Create File" or "Delete File," the process advances to step S212. If it is neither of them, the process advances to step S213, assuming that the command is "Allocate Blocks" or "Deallocate Blocks."

(S212) Since the command is "Create File" or "Delete File," the current usage updating unit 152 assigns the inode number of the specified file's parent directory to current_ino. Afterwards, the process advances to step S216.

(S213) Since the command is "Allocate Blocks" or "Deallocate Blocks," the current usage updating unit 152 assigns the inode number of the specified file itself to current_ino.

(S214) The variable current_ino contains an inode value that represents a particular object (i.e., file or directory) in the file system. The file system object identified by current_ino will be expressed hereafter as "inode(current_ino)." The current usage updating unit 152 reads a quota directory inode number out of inode(current_ino) and determines whether it is zero. If the quota directory inode number is zero, the process is terminated. If it has a non-zero value, the process advances to step S215.

(S215) The current usage updating unit 152 substitutes the non-zero quota directory inode number obtained at step S214 for current_ino.

(S216) The current usage updating unit 152 determines whether the general quota flag of inode(current_ino) is set to one. If the general quota flag is set, the process advances to step S217. If not, the process skips to step S220 in FIG. 22 via connector "D."

(S217) The current usage updating unit 152 determines whether the executed file manipulation command is either "Create File" or "Delete File" or not. If it is "Create File" or "Delete File," the process advances to step S218. If it is neither of them, the process advances to step S219.

(S218) The current usage updating unit 152 updates the current file count in the general quota information of inode(current_ino). For "Create File," it increments the current file count by one. For "Delete File," it decrements the current file count by one. The process then proceeds to step S220 in FIG. 22 via connector "D."

(S219) The current usage updating unit 152 updates the current block count in the general quota information of inode(current_ino). For "Allocate Blocks," it adds the number of allocated blocks to the current block count. For "Deallocate Blocks," it subtracts the number of allocated blocks from the current block count. The process then proceeds to step S220 in FIG. 22 via connector "D."

Figure 22:
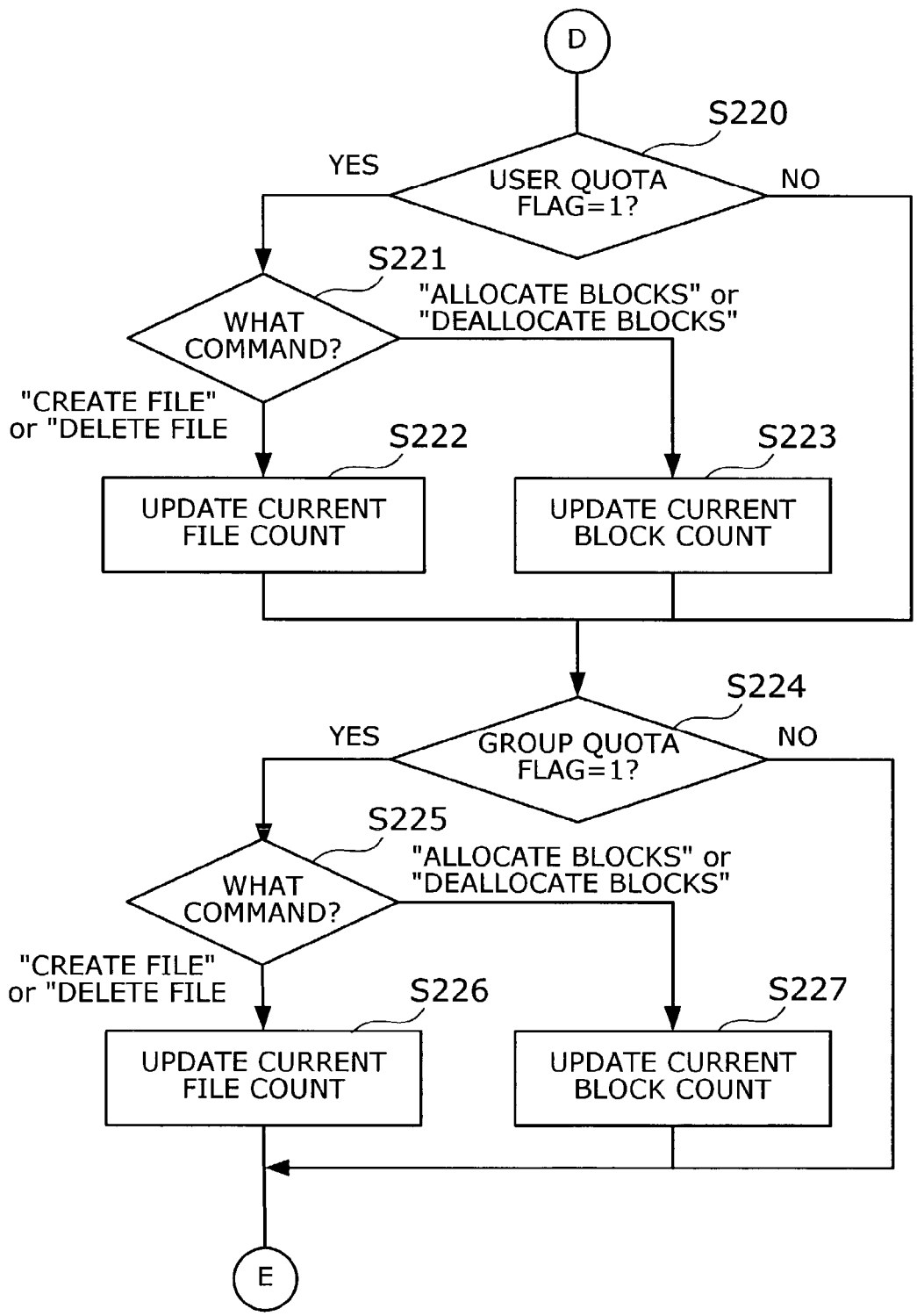

FIG. 22 is the second half of the flowchart, where the process continues as follows:

(S220) The current usage updating unit 152 determines whether the user quota flag of inode(current_ino) is set to one. If the user quota flag is set, the process advances to step S221. If not, the process skips to step S224.

(S221) The current usage updating unit 152 determines whether the executed file manipulation command is either "Create File" or "Delete File" or not. If it is either of the two, the process advances to step S222. If it is neither of them, the process advances to step S223.

(S222) The current usage updating unit 152 updates the current file count in the user quota information of inode(current_ino). This update is made selectively to the user quota information pertaining to the initiating user (i.e., the user who has initiated file manipulation). After that, the process advances to step S224.

(S223) The current usage updating unit 152 updates the current block count in the user quota information of inode(current_ino). This update is made selectively to the user quota information pertaining to the initiating user. After that, the process advances to step S224.

(S224) The current usage updating unit 152 determines whether the group quota flag of inode(current_ino) is set to one. If the group quota flag is set, the process advances to step S225. The process skips to step S214 in FIG. 21 via connector "E."

(S225) The current usage updating unit 152 determines whether the executed file manipulation command is either "Create File" or "Delete File" or not. If it is either of the two, the process advances to step S226. If it is neither of them, the process advances to step S227.

(S226) The current usage updating unit 152 updates the current file count in the group quota information of inode(current_ino). This update is made selectively to the group quota information of a particular group to which the initiating user belongs. The process returns to step S214 in FIG. 21 via connector "E."

(S227) The current usage updating unit 152 updates the current block count in the group quota information of inode(current_ino). This update is made selectively to the group quota information of a particular group to which the initiating user belongs. The process then returns to step S214 in FIG. 21 via connector "E."

Through the above-described steps, the file management system updates the current usage status of storage resources each time a file manipulation command is executed. When the specified file has hard links, its inode may contain two or more non-zero quota directory inode numbers. If this is the case, the system repeats the process of FIGS. 21 and 22 for all those quota directory inode numbers.

Quota Control Process

This section explains a process of limiting disk usage according to quota parameters. Some class of file system operations such as "Create File" and "Allocate Blocks" commands would increase the usage of disk quota, which necessitates examining management records of quota-limited directories. If the expected increase turns out to be excessive, the file management system forces the file system operation to fail with an error, thereby preventing an inappropriate file from being produced.

Figure 23:
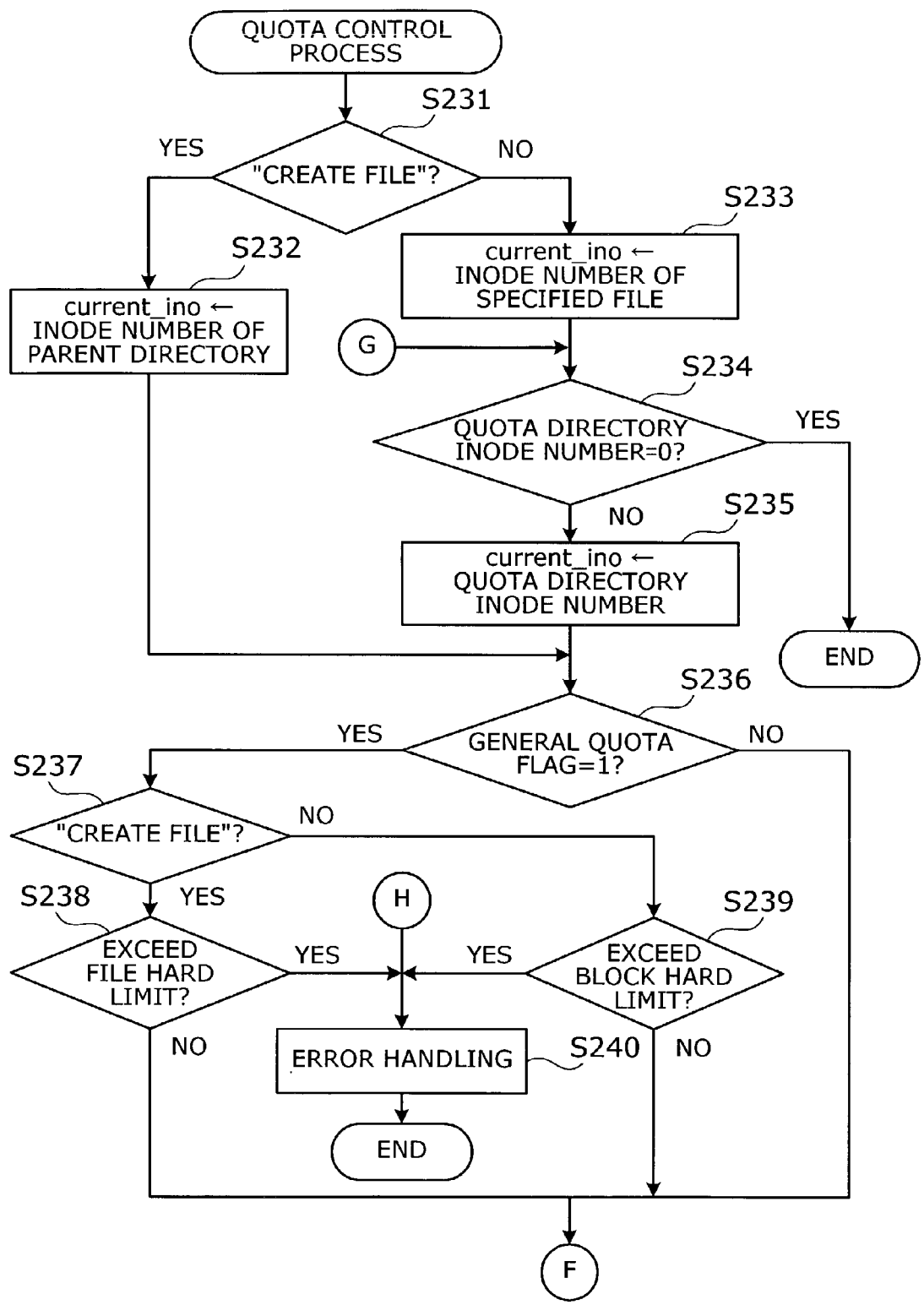
FIGS. 23 and 24 are the first and second halves of a flowchart that shows a quota control process.

FIG. 23 is the first half of a flowchart that shows such a quota control process, which is called up when a file manipulation command mentioned above. The process is executed according to the following steps:

(S231) The quota limit checking unit 151 determines whether the given file manipulation command is "Create File." If so, the process advances to step S232. If not, the process advances to step S233, assuming that the command is "Allocate Blocks."

(S232) The quota limit checking unit 151 assigns the inode number of the specified file's parent directory into a variable current_ino. After that, the process proceeds to step S236.

(S233) The quota limit checking unit 151 assigns the inode number of the specified file itself to current_ino.

(S234) The quota limit checking unit 151 reads a quota directory inode number out of inode(current_ino) and determines whether it is zero. If the quota directory inode number is zero, the process is terminated. If it has a non-zero value, the process advances to step S235.

(S235) The quota limit checking unit 151 substitutes the non-zero quota directory inode number obtained at step S234 for current_ino.

(S236) The quota limit checking unit 151 determines whether the general quota flag of inode(current_ino) is set to one. If the general quota flag is set, the process advances to step S237. If not, the process skips to step S241 in FIG. 24 via connector "F."

(S237) The quota limit checking unit 151 determines again whether the given file manipulation command is "Create File." If so, the process advances to step S238. If not, the process branches to step S239, assuming that it is "Allocate Blocks."

(S238) The quota limit checking unit 151 calculates a new file count by adding one to the current file count value that is found in the general quota information of inode(current_ino). It then determines whether the calculated new file count exceeds the file hard limit of inode(current_ino).

If so, the process advances to step S240. If not, the process proceeds to step S241 in FIG. 24 via connector "F."

(S239) The quota limit checking unit 151 calculates a new block count by adding the specified number of blocks to the current block count value that is found in the general quota information of inode(current_ino). It then determines whether the calculated new block count exceeds the block hard limit of inode(current_ino). If so, the process advances to step S240. If not, the process proceeds to step S241 in FIG. 24 via connector "F."

(S240) The quota limit checking unit 151 calls up an error handling routine and terminates the present process. More specifically, it outputs an error message to the file manipulation handler 124, and aborts the pending file manipulation command.

Figure 24:
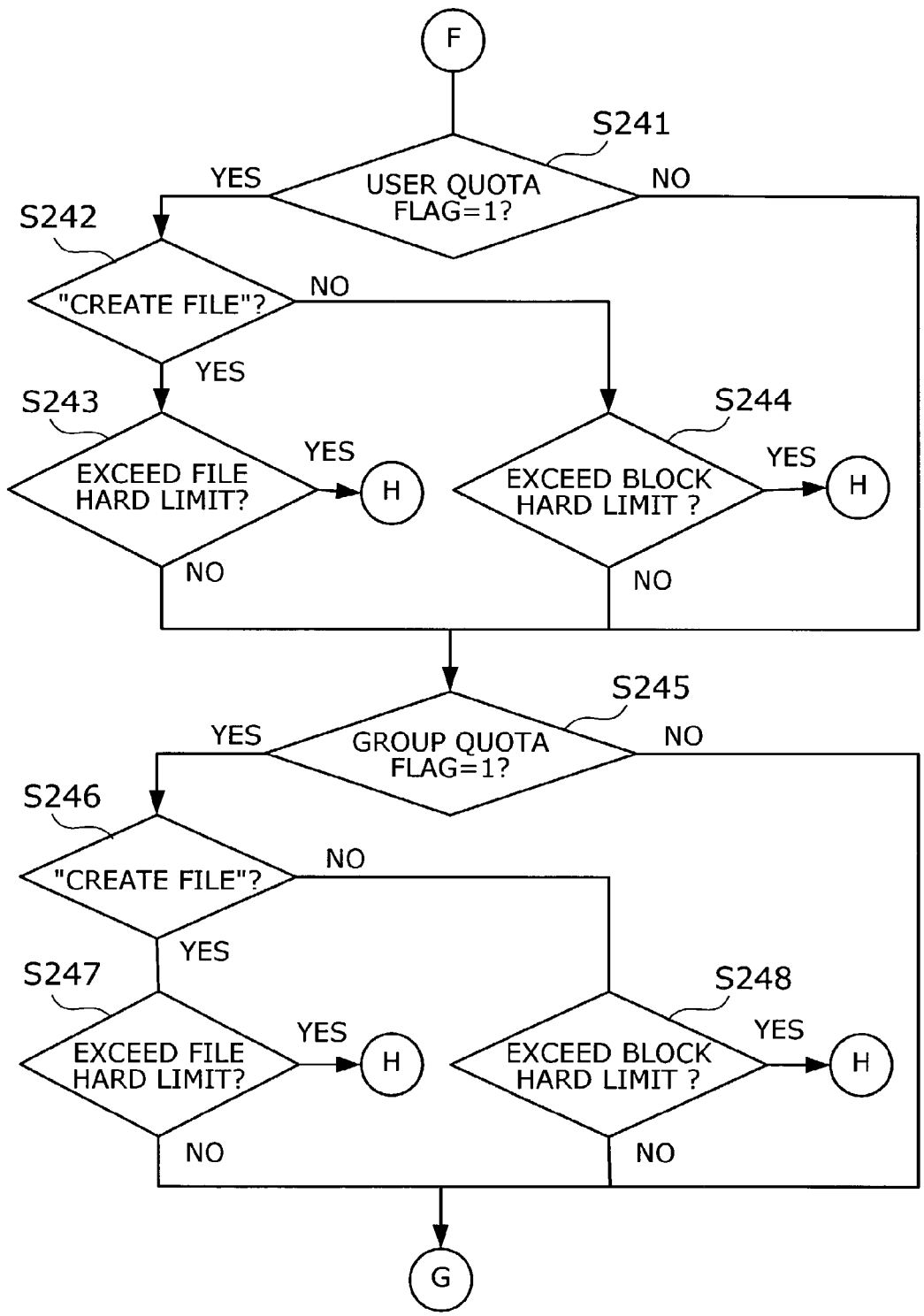

FIG. 24 is the second half of the same process, which continues as follows:

(S241) The quota limit checking unit 151 determines whether the user quota flag of inode(current_ino) is set to one. If so, the process advances to step S242.

If not, the process advances to step S245. (S242) The quota limit checking unit 151 determines again whether the given file manipulation command is "Create File." If so, the process advances to step S243. If not, the process branches to step S244, assuming that it is "Allocate Blocks."

(S243) The quota limit checking unit 151 calculates a new file count by adding one to the current file count value that is found in the user quota information of inode (current_ino) pertaining to the initiating user (i.e., the user who has initiated file manipulation). It then determines whether the calculated new file count exceeds the file hard limit being set to the same. If so, the process branches to step S240 in FIG. 23 via connector "H." If not, the process advances to step S245.

(S244) The quota limit checking unit 151 calculates a new block count by adding the specified number of blocks to the current block count value that is found in the user quota information of inode(current_ino) pertaining to the initiating user. It then determines whether the calculated new block count exceeds the block hard limit being set to the same. If so, the process branches to step S240 in FIG. 23 via connector "H." If not, the process advances to step S245.

(S245) The quota limit checking unit 151 determines whether the group quota flag of inode(current_ino) is set to one. If it is set, the process advances to step S246. If not, the process returns to step S234 in FIG. 23 via connector "G."

(S246) The quota limit checking unit 151 determines again whether the given file manipulation command is "Create File." If so, the process advances to step S247. If not, the process branches to step S248, assuming that it is "Allocate Blocks."

(S247) The quota limit checking unit 151 calculates a new file count by adding one to the current file count value that is found in the group quota information of inode (current_ino) pertaining to a particular group to which the initiating user belongs. It then determines whether the calculated new file count exceeds the file hard limit being set to the same. If it exceeds the limit, the process branches to step S240 in FIG. 23 via connector "H."If not, the process returns to step S234 in FIG. 23 via connector "G."

(S248) The quota limit checking unit 151 calculates a new block count by adding the specified number of blocks to the current block count value that is found in the group quota information of inode (current_ino) pertaining to a particular group to which the initiating user belongs. It then determines whether the calculated new block count exceeds the block hard limit being set to the same. If it exceeds the limit, the process branches to step S240 in FIG. 23 via connector "H." If not, the process returns to step S234 in FIG. 23 via connector "G."

Through the above-described steps, the file management system examines each given file manipulation command as to whether it will violate the quota limits. Normal end of the process shown in FIGS. 23 and 24 permits the file manipulation handler 124 to gain control to execute the file manipulation command. When the specified file has hard links, its inode may contain two or more non-zero quota directory inode numbers. If this is the case, the system repeats the process of FIGS. 23 and 24 for all those quota directory inode numbers.

Moving Files and Directories

Figure 25:
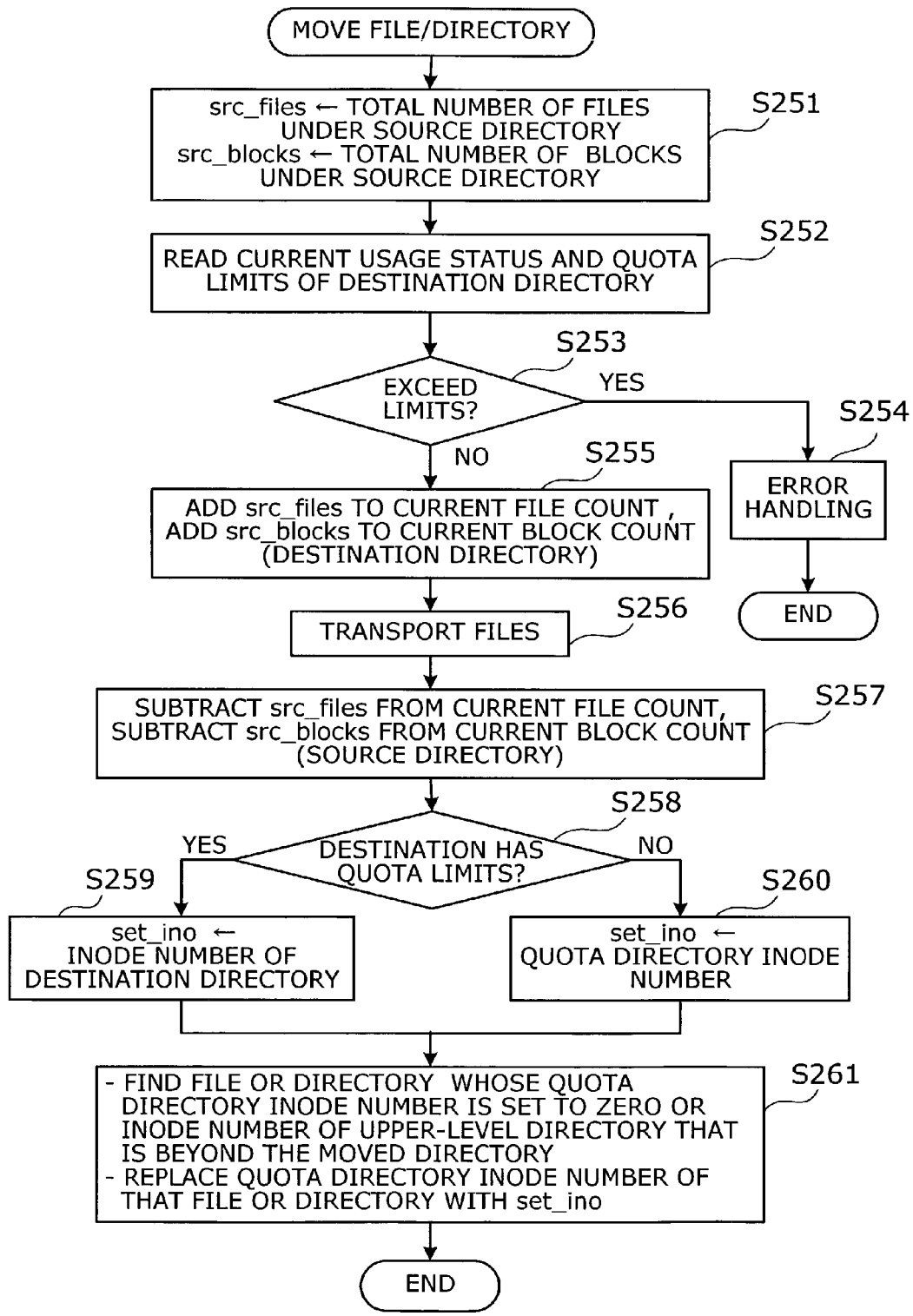
FIG. 25 is a flowchart of a process of moving a file or directory.

This section describes a process of moving a file or directory to from one directory to another. To perform this operation, the file management system has to estimate the final usage of disk quota and check whether the quota limits at the destination directory will be observed. FIG. 25 is a flowchart of a process of moving files or directories. The process is executed according to the following steps:

(S251) With respect to all files in the source directory and its subordinates, the quota limit checking unit 151 calculates the total number of files and the total amount of used space (or total number of blocks in use). It assigns the total number of files to a variable "src_files" and the total number of blocks to another variable "src_blocks."

(S252) The quota limit checking unit 151 examines the management record of the destination directory to obtain its quota parameters, including: current file count, current block count, file hard limit, and block hard limit. (S253) Based on src_files and src_blocks, the quota limit checking unit 151 estimates the resulting consumption of disk quota. If the requested file/directory movement is expected to cause excessive usage, the process proceeds to step S254. If not, the process advances to step S255.

(S254) The quota limit checking unit 151 calls up an error handling routine and terminates the present process. More specifically, it outputs an error message to the file manipulation handler 124, and aborts the pending file manipulation command.

(S255) The current usage updating unit 152 adds src_files and src_blocks to the current file count and current block count of the destination directory, respectively.

(S256) The quota limit checking unit 151 notifies the file manipulation handler 124 that the quota check at step S253 has finished successfully. In response to this, the file manipulation handler 124 transports the files to their destination.

(S257) The current usage updating unit 152 subtracts src_files and src_blocks from the current file count and current block count of the source directory, respectively.

After transporting the files, the file management system has to review the relationships between file system objects in terms of the scope of quota limits. More specifically, when a file has been moved to another directory, the quota directory inode number of that file may no longer be valid. This also happens to moved directories. The file management system thus examines each moved file and directory to update their quota directory inode numbers as necessary, according to the following steps:

(S258) The quota limit setting unit 153 determines whether the destination directory itself has quota limits in its management record. If it has, the process advances to step S259. If not, the process advances to step S260.

(S259) The quota limit setting unit 153 assigns the inode number of the destination directory to a variable "set_ino." The process then advances to step S261.

(S260) The quota limit setting unit 153 assigns the quota directory inode number of the destination directory to set_ino.

(S261) The quota limit setting unit 153 checks the quota directory inode number of the moved directory itself, as well as that of every subordinate file and directory under the moved directory, tracing downward the directory tree. During this check, the quota limit setting unit 153 may encounter such a file or directory whose quota directory inode number is set to zero or an inode number of an upper-level directory that is beyond the moved directory. If this is the case, the quota limit setting unit 153 replaces the quota directory inode number of that file or directory with set_ino that was given at step S259 or S260.

Once such a directory is found, then it will not necessary for the quota limit setting unit 153 to trace the directory tree any more. Suppose, for example, that the moved directory is quota-limited. In this case, the quota limit setting unit 153 has only to replace the quota directory inode number of the moved directory itself. There is no need to check other files and subdirectories under the moved directory, because it is obvious that their quota directory inode numbers are valid.

Through the above steps, the system moves files and directories. When the specified file has hard links, its inode may contain two or more non-zero quota directory mode numbers. If this is the case, the system repeats the steps S258 to S261 for all those quota directory inode numbers.

Figure 26:
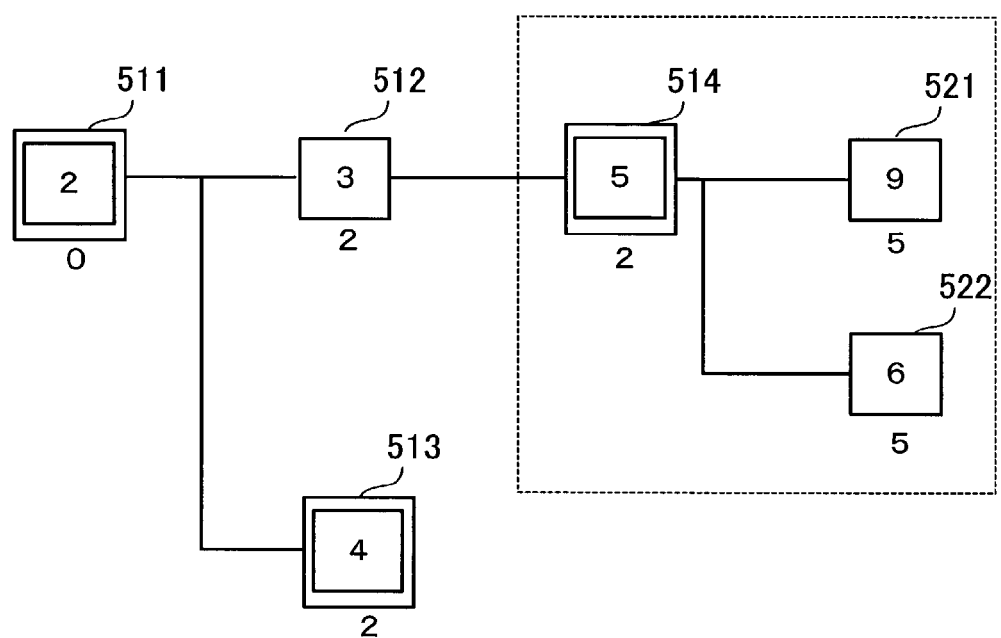
FIG. 26 shows an example of directory structure before moving a directory.
Figure 27:
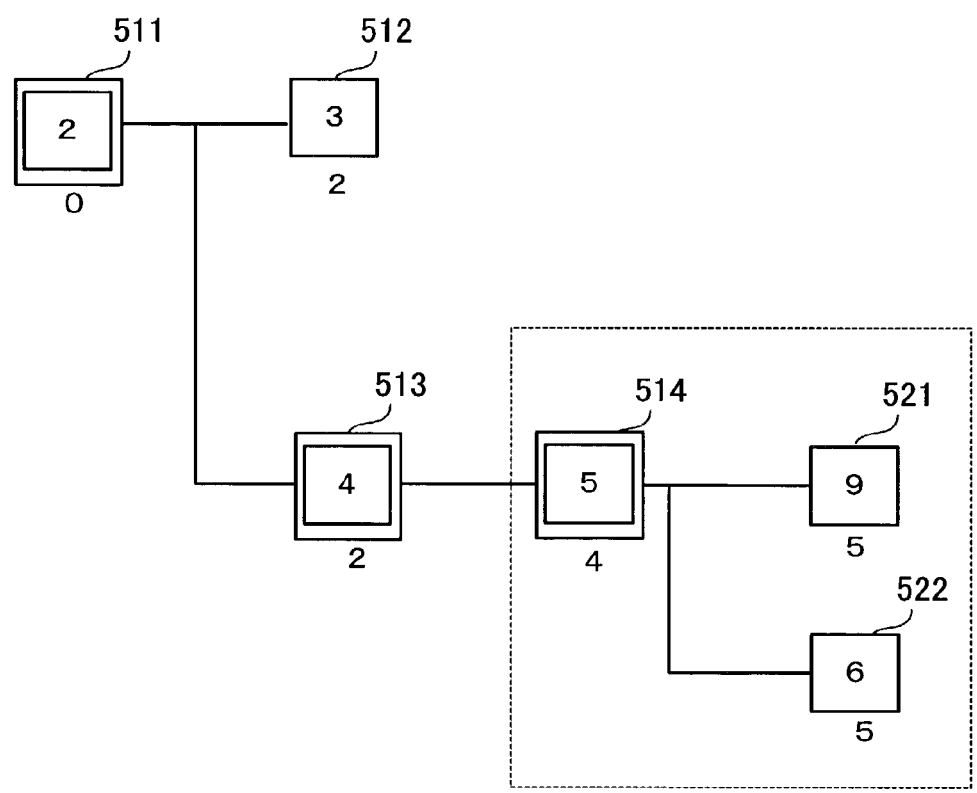
FIG. 27 shows an example of directory structure after a directory is moved.

Referring now to FIGS. 26 and 27, a specific example of replacement of quota directory inode numbers will be presented. FIG. 26 shows an example of file system structure before moving a directory. This file system has four directories 511 to 514 and two files 521 and 522.

The leftmost quota-limited directory 511 is the root directory, which is identified by its inode number "2." It has a quota directory inode number "0" since the root directory has no directories above itself.

Two child directories 512 and 513 are located immediately below the root directory 511. The former child directory 512 with an inode number "3" has no explicit quota limits. Its quota directory inode number is set to "2." On the other hand, the other child directory 513 with an inode number "4" is a quota-limited directory and has a quota directory inode number "2." The directory 512 has one immediate child directory 514, which is a quota-limited directory identified by its inode number "5." Its quota directory inode number is set to "2."

Located immediately below the directory 514 are files 521 and 522. The first file 521 is identified by its inode number "9" and has a quota directory inode number of "5." The second file 522 is identified by its inode number "6" and has a quota directory inode number of "5."

Now think of moving the directory 514 (inode "5") to the directory 513 (inode "4"). This action results in a new directory structure shown in FIG. 27. Compared to the original state shown in FIG. 26, the directory 514 is now placed as a child directory immediately below the directory 513, and its quota directory inode number has been changed from "2" to "4," while no changes have happened to the quota directory inode numbers of its subordinate files 521 and 522.

As seen from this example, movement of files and directories often causes a change to the quota directory inode numbers of moved file system objects. In the present embodiment, it is a task of the quota limit setting unit 153.

Setting Quota Parameters to Directory

This section describes a process of setting quota parameters to a particular directory so as to make it a quota-limited directory. Since this action affects the existing setup of quota directory inode numbers among directories, the file management system performs the following procedure when doing it.

When setting quota parameters to a particular directory (to be referred to as the "target directory"), the quota limit setting unit 153 examines all subordinate objects (i.e., files and directories) under the target directory, tracing downward the directory tree. It may encounter such an object whose quota directory inode number is set to zero or an inode number of an upper-level directory that is above the target directory. If this is the case, the quota limit setting unit 153 replaces the quota directory inode number of that object with the inode number of the target directory. If the encountered object is a directory, then it will not be necessary for the quota limit setting unit 153 to examine the subordinate objects under that directory.

Subsequently, the current usage updating unit 152 sums up the number of files and the amount of used space, for all files in the target directory and its subdirectories. With those results, the current usage updating unit 152 then updates the target directory's current file count and current block count.

Figure 28:
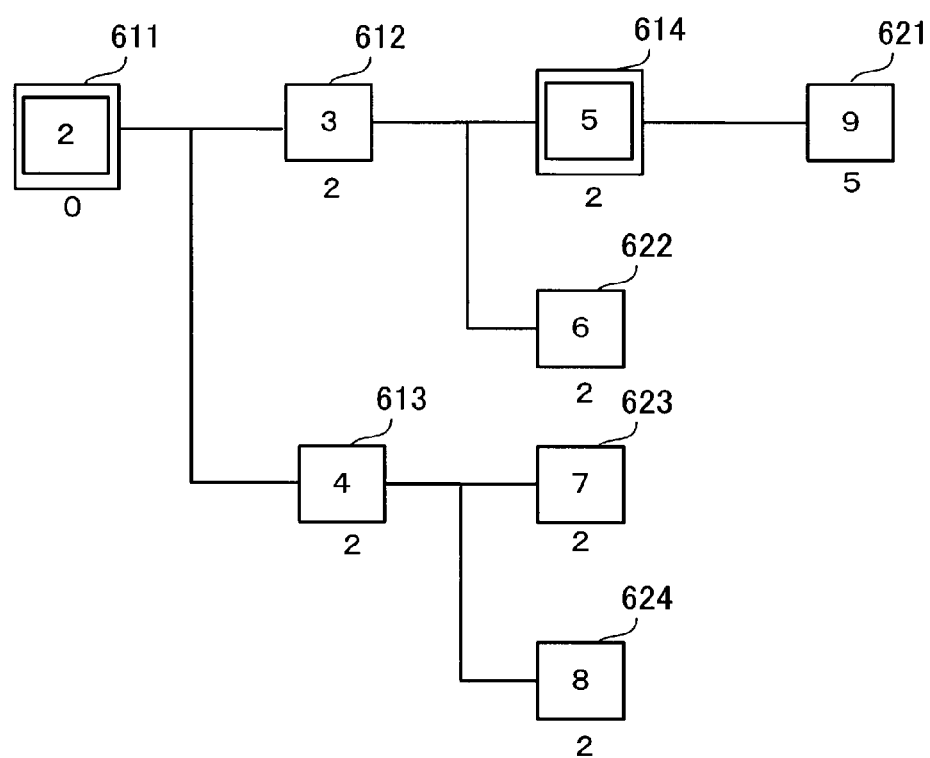
FIG. 28 shows an example of directory setup where some directories have no quota limits.

FIG. 28 shows an example of directory setup, where some directories have no quota limits set in their management records. The illustrated directory structure contains four directories 611 to 614 and four files 621 to 624.

The leftmost directory 611 with quota limits is the root directory, identified by its inode number "2" and has a zero-valued quota directory inode number. Located immediately below the root directory 611 are two child directories 612 and 613. The former directory 612 is identified by its inode number "3," and the latter directory 613 by its inode number "4." Both directories 612 and 613 have a quota directory inode number of "2," while neither of them have explicit quota limits.

The directory 612 contains a quota-limited child directory 614 with an inode number "5" and a file 622 with an inode number "6." A quota directory inode number "2" is set to the directory 614 and file 622. The directory 614 contains a file 621 with an inode number "9," which has a quota directory inode number of "5."

The directory 613, on the other hand, has two files 623 and 624. The former file 623 is identified by its inode number "7," while the latter file 624 is identified by its inode number "8." Both files 623 and 624 have a quota directory inode number of "2."

Figure 29:
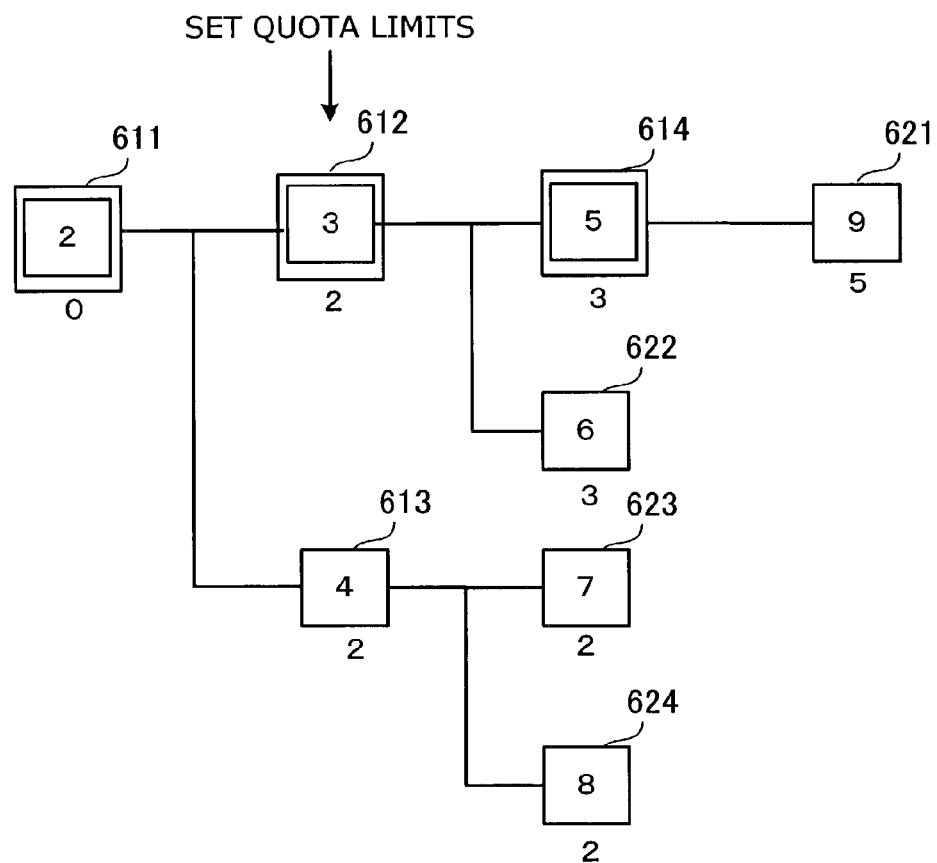
FIG. 29 shows an example of directory setup after setting quota limits to one directory.

Now think of the second directory 612 which newly receives a set of quota parameters as the target directory. FIG. 29 shows the setup after setting quota limits to one directory. Compared to the original state shown in FIG. 28, the directory 612 is now indicated as a quota-limited directory (double line box), and the quota directory inode number of the directory 614 has been changed from "2" to "3." Similarly, the file 622's quota directory inode number has been changed from "2" to "3."

Advantages of Directory-based Quota Control

As seen from the foregoing descriptions, the present invention enables a file system, such as the NAS filer 100, to manage the number of files and the amount of file data in real time and on an individual directory basis. This directory-based quota control makes more advanced, fine-tuned quota settings possible, thus improving the usability of file systems.

Functions equivalent to such directory-based quota management have been realized in conventional file management systems by, for example, setting up separate file systems to serve different quota management needs. This conventional method, however, has such a usability problem that the quota limits should be closely associated with file system sizes, and for this reason, the file system has to be restructured when a larger quota is need.

Unlike the conventional method, the present embodiment permits each individual directory to have quota parameters, so that the usage of disk space will be controlled with reference to the quota limits of the directories concerned, each time the user performs a file manipulation command. Taking advantage of this feature, a plurality of workgroups can share a single file system as follows. That is, each workgroup is assigned a dedicated directory to store data files they produce. By setting appropriate quota limits to individual workgroups, it is possible to prevent one workgroup's storage capacity from exhausting due to increased data volume in other workgroups. In addition, the awareness of quota limits would encourage the workgroups' self cleaning efforts in their respective directories, which leads to more efficient usage of storage resources in the entire system. Besides being able to allocate group quota, the proposed file management system allows each individual user to have a dedicated disk quota in a different directory, as necessary. In this way, the present invention enables more fine-tuned file system management.

Another distinct feature of the proposed file management system is that every directory and file object has a "quota directory inode number" in its own management record. This inode number is used to locate their closest quota-limited directory that holds quota parameters relevant to itself and its subordinate objects. While a class of commands such as "Create File," "Delete File,""Allocate Blocks," and "Deallocate Blocks" necessitate an update to the file system, the provision of quota directory inode numbers alleviates the workloads in performing such updates, thus minimizing its performance penalty.

As mentioned above, every file has a quota directory inode number in its file management record. In other words, the management record holds only one inode number that indicates the closest quota directory among others, as opposed to holding them all. This configuration is beneficial in handling a directory relocation command or other structure-changing operations, because it minimizes the performance penalty in updating directory and file management records with the result of such a command.

When a file is hard-linked to a plurality of directories, their respective closest quota directories are determined and stored in the management record of that file. Accordingly, the quota control covers all those hard-linked directories in the same way as other directories having no hard links. That is, the proposed file management system supports file systems containing hard-linked directories.

While the above-described embodiments provide only a single level of limits for quota control, the present invention should not be limited to that specific arrangement. It is possible to set multiple-level quota limits to each directory. More specifically, the first-level limits are soft limits with a time limit parameter. The second-level limits are hard limits with more relaxed values in terms of the maximum number of files or blocks. These hard limits are what we have described as "file hard limit" and "block hard limit" in earlier sections.

When the current usage has exceeded the soft limits, the file management system begins counting the time, optionally sending out a warning message to the user's console. Upon expiration of the predefined time limit, the file management system inhibits further creation of files or further allocation of disk block in all the directories concerned. In this way, multiple-level quota limits give time to users to solve the shortage of their disk spaces by themselves, thus avoiding the risk of unexpected trouble in, for example, saving important files. In actual implementation of soft limits, one can set different time limits to the file count and block count.

File Management Program and Storage Media

The above-described NAS filer 100 is a file server where the file management system of the present invention is embodied as a file system controller 120. Users' client computer 20 is connected the file system controller 120 via a network, allowing the application 21 to manipulate the file system. This client-server configuration, however, is only an example, and it would be possible to integrate the file system controller 120 and application 21 into a single piece of equipment. For example, the client 20 may incorporate the functions of the file system controller 120 to manage its local mass storage.

Assuming a client-server configuration again, the proposed processing functions are implemented as file management programs for use with a server and client computers. The programs include server programs to provide NAS filer capabilities and other server functions, and client programs to provide client computer functions. Various services described in the preferred embodiments are offered from such server programs running on an appropriate server platform. Likewise, the client functions are realized by executing the client programs on an appropriate client computer.

Instructions of the server and client programs are stored in a computer-readable medium for the purpose of storage and distribution. Suitable computer-readable storage media include: magnetic storage media, optical discs, magneto-optical storage media, and solid state memory devices. Magnetic storage media include hard disk drives (HDD), flexible disks (FD), and magnetic tapes. Optical discs include: digital versatile disc (DVD) families (e.g., DVD-ROM, DVD-RAM, DVD-R, DVD-RW, DVD+R, DVD+RW), compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the circulation of server and client programs. Network-based distribution of client programs is also possible, in which case, master program files stored in a server computer are downloaded to client computers over a network.

The server computer stores server programs in its local storage unit, which have been previously installed from a portable storage media. The server computer provides its intended functions by executing the server programs read out of the local storage unit. Alternatively, the server computer may execute those programs directly from the portable storage media.

The client computer, on the other hand, stores client programs in its local storage unit, which have been previously installed from a portable storage media or downloaded from the server computer. The client computer provides its intended functions by executing the client programs read out of the local storage unit. As an alternative way of program execution, the client computer may execute the client programs directly from the portable storage media. Another alternative method is such that the server computer supplies a client computer with client programs on demand, allowing the client computer to execute them upon delivery.

CONCLUSION

The above discussion is summarized as follows. According to the present invention, every file and directory has a parent directory record that contains the identifier of the parent directory to which they belong. The parent directory record is retrieved in response to a parent directory inquiry, which enables upward tracing of a directory tree from any given file or directory. With this feature, the file management system can find file paths with less processing loads. This feature also makes it possible to apply a particular attribute to a plurality of files and directories by setting that attribute to their common upper-level directory.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium storing a file management program which manages computer files and directories by using identifiers thereof, the file management program causing a computer system to function as:

file manipulation means, responsive to a file manipulation command, for placing each given file to a specified directory, thus assigning the specified directory as a parent directory of the given file;

parent directory record management means, responsive to the placement of the given file by said file manipulation means, for defining a parent directory record of the given file by setting within the given file the identifier of the parent directory of that given file; and parent directory inquiry handling means, responsive to a parent directory inquiry about a specific file, for retrieving the parent directory record of the specified file and outputting the identifier of the parent directory contained in the retrieved parent directory record, wherein the given file has a plurality of parent directories, and wherein said parent directory record management means sets the identifiers of the parent directories into the parent directory record within the given file.

2. The computer-readable storage medium according to claim 1, which causes the computer system to function further as prioritization means for prioritizing the plurality of identifiers contained in the parent directory record of each file, wherein said parent directory inquiry handling means outputs the plurality of identifiers according to the priorities assigned thereto by said prioritization means.

3. The computer-readable storage medium according to claim 1, wherein:

said file manipulation means places each given lower-level directory below an upper directory in response to another file manipulation command;

said parent directory record management means, responsive to the placement of the given lower-level directory by said file manipulation means, for defining a parent directory record of the given lower-level directory by setting thereto the identifier of the parent directory of the given lower-level directory; and the computer system functions further as searching means, responsive to a path search request for a specified file, for searching for a path from the specified file to the highest-level directory by tracing one directory to another, with reference to the parent directory records thereof to obtain the identifier of the directory at the next higher level.

4. The computer-readable storage medium according to claim 3, wherein:

the specified file has a plurality of parent directories;

said parent directory record management means sets the identifiers of the parent directories to the parent directory record of the specified file; and said searching means searches for a plurality of paths each reaching the highest-level directory via a different one of the plurality of parent directories to which the specified file belongs.

5. The computer-readable storage medium according to claim 3, which causes the computer system to function further as:

attribute setting means for setting attributes to the directories, the attributes being associated with predetermined file management rules; and means for sending the path search request for the specified file to said path searching means, receiving the path from said searching means, and applying to the specified file the file management rules associated with the attributes being set to each directory along the received path.

6. A computer which manages computer files and directories in a storage device by using identifiers thereof, the computer comprising:

file manipulation means, responsive to a file manipulation command, for placing each given file to a specified directory, thus assigning the specified directory as a parent directory of the given file;

parent directory record management means, responsive to the placement of the given file by said file manipulation means, for defining a parent directory record of the given file by setting within the given file the identifier of the parent directory of that given file; and parent directory inquiry handling means, responsive to a parent directory inquiry about a specific file, for retrieving the parent directory record of the specified file and outputting the identifier of the parent directory contained in the retrieved parent directory record, wherein the given file has a plurality of parent directories, and wherein said parent directory record management means sets the identifiers of the parent directories into the parent directory record within the given file.

7. The computer according to claim 6, further comprising prioritization means for prioritizing the plurality of identifiers contained in the parent directory record of each file, wherein said parent directory inquiry handling means outputs the plurality of identifiers according to the priorities assigned thereto by said prioritization means.

8. The computer according to claim 6, wherein:

said file manipulation means places each given lower-level directory below an upper directory in response to another file manipulation command;

said parent directory record management means, responsive to the placement of the given lower-level directory by said file manipulation means, for defining a parent directory record of the given lower-level directory by setting thereto the identifier of the parent directory of the given lower-level directory; and the file management system further comprises searching means, responsive to a path search request for a specified file, for searching for a path from the specified file to the highest-level directory by tracing one directory to another, with reference to the parent directory records thereof to obtain the identifier of the directory at the next higher level.

9. The computer according to claim 8, wherein:

the specified file has a plurality of parent directories;

said parent directory record management means sets the identifiers of the parent directories to the parent directory record of the specified file; and said searching means searches for a plurality of paths each reaching the highest-level directory via a different one of the plurality of parent directories to which the specified file belongs.

10. The computer according to claim 8, further comprising:

attribute setting means for setting attributes to the directories, the attributes being associated with predetermined file management rules; and means for sending the path search request for the specified file to said path searching means, receiving the path from said searching means, and applying to the specified file the file management rules associated with the attributes being set to each directory along the received path.

11. A computer-readable storage medium storing a file management program which manages computer files and directories by using identifiers thereof, the file management program causing a computer system to function as:

file manipulation means, responsive to a file manipulation command, for placing each given file to a specified directory, thus assigning the specified directory as a parent directory of the given file;

parent directory record management means, responsive to the placement of the given file by said file manipulation means, for defining a parent directory record of the given file by setting within the parent directory record associated with the given file the identifier of the parent directory of the given file; and parent directory inquiry handling means, responsive to a parent directory inquiry about a specific file, for retrieving the parent directory record of the specified file and outputting the identifier of the parent directory contained in the retrieved parent directory record, wherein the parent directory record associated with the given file has a plurality of parent directories, and wherein said parent directory record management means sets the identifiers of the parent directories into the parent directory record associated with the given file.

12. A computer which manages computer files and directories in a storage device by using identifiers thereof, comprising:

file manipulation means, responsive to a file manipulation command, for placing each given file to a specified directory, thus assignment the specified directory as a parent directory of the given file;

parent directory record management means, responsive to the placement of the given file by said file manipulation means, for defining a parent directory record of the given file by setting within the parent directory record associated with the given file the identifier of the parent directory of the given file; and parent directory inquiry handling means, responsive to a parent directory inquiry about a specific file, for retrieving the parent directory record of the specified file and outputting the identifier of the parent directory contained in the retrieved parent directory record, wherein the parent directory record associated with the given file has a plurality of parent directories, and wherein said parent directory record management means sets the identifiers of the parent directories into the parent directory record associated with the given file.

* * * * *